United States Patent
Schuster

(10) Patent No.: US 11,220,813 B2
(45) Date of Patent: *Jan. 11, 2022

(54) CLOSET COLLAR APPARATUS AND SYSTEMS

(71) Applicant: Danco, Inc., Irving, TX (US)

(72) Inventor: Michael J. Schuster, Shorewood, IL (US)

(73) Assignee: Danco, Inc., Irving, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/902,947

(22) Filed: Jun. 16, 2020

(65) Prior Publication Data
US 2020/0308817 A1    Oct. 1, 2020

Related U.S. Application Data

(63) Continuation of application No. 13/771,773, filed on Feb. 20, 2013, now Pat. No. 10,683,653, and a
(Continued)

(51) Int. Cl.
*E03D 11/16* (2006.01)
*E03D 11/17* (2006.01)
*F16L 5/10* (2006.01)

(52) U.S. Cl.
CPC .............. *E03D 11/16* (2013.01); *E03D 11/17* (2013.01); *F16L 5/10* (2013.01); *Y10T 29/49826* (2015.01)

(58) Field of Classification Search
CPC ........................................................ E03D 11/16
(Continued)

(56) References Cited

U.S. PATENT DOCUMENTS

| 1,333,368 A | 3/1920 | Auer |
| 2,427,431 A | 9/1947 | Wieland |

(Continued)

FOREIGN PATENT DOCUMENTS

| BR | 102013031190 | 4/2016 |
| CA | 2137033 | 5/1996 |

(Continued)

OTHER PUBLICATIONS

[Proposed] Order Denying Danco, Inc.'s Motion to Dismiss/Strike Defendant's Inequitable Counterclaim/Affirmative Defense for Failure to State a Claim filed Mar. 31, 2017 in the litigation case of *Danco, Inc.* v. *Lavelle Industries, Inc.*, Civil Action No. 5:16-CV-00048-CMC.
(Continued)

*Primary Examiner* — Christine J Skubinna
(74) *Attorney, Agent, or Firm* — Thomas | Horstemeyer, LLP

(57) ABSTRACT

Disclosed are various embodiments for facilitating the installation of a toilet over a closet collar for a drain pipe. According to various embodiments, a toilet seal assembly is positioned between the toilet and the closet collar, providing a seal between the toilet and the flange of the closet collar. The toilet seal assembly may include a flexible rubber seal and a compressible foam seal ring. The flexible rubber seal may include an annular wall, an upper ring that extends radially inward from the annular wall, and a lower ring that extends radially outward from the annular wall. The compressible foam seal ring may be disposed on the lower ring of the flexible rubber seal.

18 Claims, 47 Drawing Sheets

Related U.S. Application Data continuation of application No. 15/944,442, filed on Apr. 3, 2018, which is a continuation of application No. 13/771,773, filed on Feb. 20, 2013, now Pat. No. 10,683,653.

(60) Provisional application No. 61/667,377, filed on Jul. 2, 2012, provisional application No. 61/600,794, filed on Feb. 20, 2012.

(58) Field of Classification Search
USPC .......................................................... 4/300
See application file for complete search history.

(56) References Cited

U.S. PATENT DOCUMENTS

| | | | |
|---|---|---|---|
| 2,447,712 | A * | 8/1948 | Nathan .................... F16F 1/373 248/615 |
| 2,750,216 | A | 6/1956 | Thies |
| 2,908,513 | A | 10/1959 | Karlinski |
| 2,976,543 | A | 3/1961 | Turner et al. |
| 3,037,212 | A | 6/1962 | Ferdinand |
| 3,224,014 | A | 12/1965 | Pietrzak |
| 3,228,039 | A * | 1/1966 | Freeman .................... E03C 1/24 4/694 |
| 3,238,538 | A | 3/1966 | Turner |
| 3,349,412 | A | 10/1967 | Schwartz et al. |
| 3,400,411 | A | 9/1968 | Harvey |
| 3,501,172 | A | 3/1970 | Pickard |
| 3,680,896 | A | 8/1972 | Cupit |
| 3,821,820 | A | 7/1974 | Thompson |
| 3,952,340 | A | 4/1976 | Cuschera |
| 4,090,267 | A | 5/1978 | Cuschera |
| 4,237,667 | A | 12/1980 | Jarosz et al. |
| 4,406,480 | A | 9/1983 | Izzi |
| 4,482,161 | A | 11/1984 | Izzi |
| 4,502,166 | A | 3/1985 | Brown |
| 4,515,398 | A | 5/1985 | Machon |
| 5,018,224 | A | 5/1991 | Hodges |
| 5,185,890 | A | 2/1993 | Dismore et al. |
| 5,219,619 | A | 6/1993 | Trouve et al. |
| 5,377,361 | A | 1/1995 | Piskula |
| 5,432,957 | A | 7/1995 | Fernie et al. |
| 5,695,222 | A | 12/1997 | Hodges |
| 5,862,533 | A | 1/1999 | Johnson et al. |
| 6,332,632 | B1 | 12/2001 | Hodges |
| 6,519,784 | B2 | 2/2003 | Carwile |
| 6,581,214 | B1 | 6/2003 | Love et al. |
| 6,644,670 | B2 | 11/2003 | Etcheverry |
| 6,691,331 | B2 * | 2/2004 | Gallacher .............. E03D 11/16 277/606 |
| 6,694,537 | B2 | 2/2004 | Telles |
| 6,719,294 | B2 | 4/2004 | Nguyen et al. |
| 6,745,408 | B2 | 6/2004 | Spells |
| 6,789,275 | B2 | 9/2004 | Spells et al. |
| 6,883,187 | B2 | 4/2005 | Cornwall |
| 7,069,603 | B2 | 7/2006 | Flushing |
| D574,931 | S | 8/2008 | Hughes |
| 7,584,970 | B2 | 9/2009 | Ponce |
| 7,814,580 | B2 * | 10/2010 | Coronado .............. E03D 11/17 4/252.6 |
| 8,069,502 | B2 | 12/2011 | Coronado |
| 8,099,801 | B2 * | 1/2012 | Hughes .................... E03D 11/16 4/252.5 |
| D656,591 | S | 3/2012 | Miller et al. |
| 8,671,470 | B2 | 3/2014 | Miller et al. |
| 8,875,320 | B2 | 11/2014 | Peñúñuri et al. |
| 8,955,172 | B2 | 2/2015 | Culwell |
| 9,062,445 | B2 | 6/2015 | Duncan et al. |
| 9,273,455 | B2 | 3/2016 | Schuster |
| 9,512,605 | B2 | 12/2016 | Duncan |
| 9,556,603 | B2 | 1/2017 | Guthrie |
| 9,663,934 | B2 | 5/2017 | Duncan |
| 9,816,261 | B2 | 11/2017 | Schuster |
| 10,017,932 | B2 | 7/2018 | Mehari |
| 10,100,505 | B2 | 10/2018 | Coronado |
| 10,151,095 | B2 | 12/2018 | Coronado et al. |
| 10,280,606 | B1 | 5/2019 | Smith |
| 10,294,647 | B2 | 5/2019 | Fong et al. |
| 2001/0023505 | A1 | 9/2001 | Atkins |
| 2001/0040348 | A1 | 11/2001 | Kojima |
| 2003/0009820 | A1 | 1/2003 | Telles |
| 2003/0052461 | A1 | 3/2003 | Ponce |
| 2003/0126676 | A1 | 7/2003 | Gallacher et al. |
| 2004/0098798 | A1 | 5/2004 | Atkins et al. |
| 2004/0128752 | A1 | 7/2004 | Atkins et al. |
| 2004/0163165 | A1 | 8/2004 | Ortiz et al. |
| 2005/0108814 | A1 | 5/2005 | Thompson |
| 2005/0278841 | A1 | 12/2005 | Coronado et al. |
| 2006/0225195 | A1 | 10/2006 | Scholer |
| 2007/0011799 | A1 | 1/2007 | Brooks |
| 2007/0256220 | A1 | 11/2007 | Lee et al. |
| 2009/0119826 | A1 | 5/2009 | Coronado |
| 2009/0165195 | A1 | 7/2009 | Atkins et al. |
| 2010/0037376 | A1 | 2/2010 | Hughes |
| 2010/0123307 | A1 | 5/2010 | Coronado |
| 2011/0094024 | A1 | 4/2011 | Grech et al. |
| 2011/0185487 | A1 | 8/2011 | Miller et al. |
| 2011/0185488 | A1 | 8/2011 | Miller et al. |
| 2014/0062035 | A1 | 3/2014 | Coronado et al. |
| 2014/0366256 | A1 | 12/2014 | Coronado |
| 2017/0321410 | A1 | 11/2017 | Connell |
| 2019/0003170 | A1 | 1/2019 | Loggia et al. |
| 2019/0085548 | A1 | 3/2019 | Guthrie |

FOREIGN PATENT DOCUMENTS

| | | |
|---|---|---|
| CA | 2578327 | 8/2008 |
| CN | 2931606 | 8/2007 |
| CN | 106836429 | 6/2017 |
| CN | 107044163 | 8/2017 |
| DE | 2205532 | 8/1973 |
| DE | 2525203 | 12/1976 |
| EP | 1054112 | 11/2000 |
| EP | 1655528 | 10/2006 |
| EP | 3336268 | 6/2018 |
| GB | 1512600 | 6/1978 |
| GB | 1531449 | 11/1978 |
| GB | 2012902 | 8/1979 |
| GB | 1567326 | 5/1980 |
| GB | 2136905 | 9/1984 |
| JP | H07331726 | 12/1995 |
| JP | 2010007286 | 1/2010 |
| KR | 200388701 | 7/2005 |
| KR | 100841718 | 6/2008 |
| KR | 20090109601 | 10/2009 |
| KR | 20100007292 | 7/2010 |
| KR | 20110027239 | 3/2011 |
| KR | 101038117 | 5/2011 |
| KR | 101971165 | 4/2019 |
| KR | 101975327 | 5/2019 |
| WO | 0125556 | 4/2001 |
| WO | 0132996 | 5/2001 |
| WO | 0198595 | 12/2001 |
| WO | 2014016703 | 1/2014 |
| WO | 2016054771 | 4/2016 |

OTHER PUBLICATIONS

BlueSeal Toilet Donut Seal Ring—Superior to Standard Wax Rings—Ends Toilet Base Leaking and Subfloor Damage—Amazon.com. Date First Available: Jan. 2, 2017 (https://www.amazon.com/BlueSeal-Toilet-Donut-Seal-Ring/dp/B00MQAT3UA) Access Date: Jul. 15, 2019.

Defendant Lavelle Industries, Inc.'s Proposed Second Amended Answer, Affirmative Defenses, and Counterclaims to Danco, Inc.'s Complaint for Patent Infringement filed Mar. 31, 2017 in the litigation case of *Danco, Inc.* v. *Lavelle Industries, Inc.*, Civil Action No. 5:16-CV-00048-CMC.

Defendant, Lavelle Industries, Inc's Answer, Affirmative Defenses and Counterclaims to Danco, Inc.'s Complaint for Patent Infringe-

(56) References Cited

OTHER PUBLICATIONS ment filed on Aug. 8, 2016 in Case No. 5:16-CV-00048-CMC, Eastern District of Texas, Texarkana Division.
Defendant, Lavelle Industries, Inc.'s Amended Answer, Affirmative Defenses and Amended Counterclaim to Danco, Inc.'s Complaint for Patent Infringement filed Feb. 28, 2017 in the litigation case of *Danco, Inc.* v. *Lavelle Industries, Inc.*, Civil Action No. 5:16-CV-00048-CMC.
EasyDrain Ref. 030706-424 Soft Rubber Universal Better Than Wax Toilet seat Seal, Wax-Free Toilet Bowl Gasket—Amazon.com. Date First Available: Oct. 4, 2017 (https://www.amazon.com/dp/B07666QBYS/ref=sspa_dk_detail_4?psc=1) Access Date: Jul. 15, 2019.
Elastic Toilet Gasket (Wax Free) with Toilet Bolts Included-EG1002—The Home Depot Date. (https://www.homedepot.com/p/Elastic-Toilet-Gasket-Wax-Free-with-Toilet-Bolts-Included-EG) Access Date: Jul. 15, 2019.
Email to Attorney Culbertson dated Sep. 12, 16 in the litigation case of *Danco, Inc.* v. *Lavelle Industries, Inc.*, Civil Action No. 5:16-CV-00048-CMC.
Sticky Elastomer Toilet Gasket Kit with Extension and Bolts-TFK-123—The Home Depot. (https://www.homedepot.com/p/Sticky-Elastomer-Toilet-Gasket-Kit-with-Extension-and-Bolts) Access Date: Jul. 15, 2019.
Sani Seal Llc BL01 Waxless Toilet Gasket—Toilet Wax Seal—Amazon.com. Date First Available: Dec. 4, 2010 (https://www.amazon.com/Sani-BL01-Waxless-Toilet-Gasket/dp/B005K89RQU/ref=pd cp_60) Access Date: Jul. 15, 2019.
Plumbcraft 7140300 Seal Tight Waxless Gasket Kit-Universal FIT Any Toilet—Amazon.com. Date First Available Sep. 7, 2016. (https://www.amazon.com/dp/B01LQIH3XQ/ref=psdc_3226967011_t3_B00NOD4R7M) Access Date: Jul. 15, 2019.
Petition for Inter Partes Review under 35 U.S.C. 311-319 and 37 CFR 42.100, et, seq. filed on Oct. 28, 2016 in the *Lavelle Industries, Inc.* v. *Danco, Inc.* case, United States Patent and Trademark Office before the Patent Trial and Appeal Board for U.S. Pat. No. 9,273,455.
Lavelle Industries, Inc.'s Response to Danco, Inc.'s Motion to Dismiss/Strike Defendant's Inequitable Counterclaim/Affirmative Defense for Failure to State a Claim filed Mar. 31, 2017 in the litigation case of *Danco, Inc.* v. *Lavelle Industries, Inc.*, Civil Action No. 5:16-CV-00048-CMC.
Korky 6000BP Universal Toilet WaxFree Seal with Hardware—Toilet Installation Made Easy—Made in USA—Amazon.com. Date First Available: Sep. 18, 2014 (https://www.amazon.com/Korky-6000BP-Universal-WaxFree-Hardware/dp/B00NOD4R7M/re) Access Date: Jul. 15, 2019.
Invalidity Contentions of Lavelle Industries, Inc. in the litigation case of *Danco, Inc.* v. *Lavelle Industries, Inc.*, Civil Action No. 5:16-CV-00048-CMC mailed on Oct. 11, 2016.
Fluidmaster 7530P8 Universal Better Than Wax Toilet Seal, Wax-Free Toilet Bowl Gasket—Amazon.com. Date First Available: Dec. 19, 2014. (https://www.amazon.com/Fluidmaster-7530P8-Universal-Better-Wax-Free/dp/B00R7D35TQ/r) Access Date: Jul. 15, 2019.
Fernco Inc. FTS-4 Wax Free Toilet Seal, 4-Inch, Iron—Toilet And Urinal Parts—Amazon.com. Date First Available Feb. 17, 2007. (https://www.amazon.com/Fernco-Inc-FTS-4-Toilet-4-Inch/dp/B000BVMZUG/ref=pd_sbs_60_) Access Date: Jul. 15, 2019.
Fernco Inc. Available Fernco FTS-3 3-Inch Wax Free Toilet Seal—Wax Gasket—Amazon.com. Date First Available: May 3, 2006. (https://www.amazon.com/Fernco-Available-FTS-3-3-Inch-Toilet/dp/B000BQUJEA/ref=pd_rhf) Access Date: Jul. 15, 2019.
Examiner's Report dated Dec. 17, 2018 for Application No. 2,806,916.
Response to Examiner's Report dated Dec. 17, 2018 dated Jun. 6, 2019 for Application No. 2,806,916.
Examiner's Report dated Jul. 16, 2019 for Application No. 2,806,916.
Examiner's Report dated Apr. 17, 2020 for Application No. 2,806,916.
Final Office Action dated May 19, 2016 for U.S. Appl. No. 13/771,773.
Final Office Action dated Oct. 2, 2017 for U.S. Appl. No. 13/771,773.
Final Office Action dated Dec. 27, 2018 for U.S. Appl. No. 13/771,773.
Final Office Action dated Jan. 20, 2016 for U.S. Appl. No. 13/974,918.
Appeal Brief Filed mailed Mar. 9, 2020 for U.S. Appl. No. 15/944,442.
Appeal Brief Filed mailed Feb. 7, 2020 for U.S. Appl. No. 15/944,442.
Advisory Action dated Nov. 26, 2019 for U.S. Appl. No. 15/944,442.
Non-final Office Action in related U.S. Appl. No. 13/974,918 dated Jun. 12, 2015.
Non-Final Office Action dated Jan. 31, 2018 for U.S. Appl. No. 15/791,950.
Non-Final Office Action dated Mar. 18, 2016 for U.S. Appl. No. 14/693,472.
Non-Final Office Action dated Apr. 7, 2016 for U.S. Appl. No. 13/974,918.
Non-Final Office Action dated Jun. 24, 2020 for U.S. Appl. No. 15/944,442.
Non-Final Office Action dated Jul. 24, 2020 for U.S. Appl. No. 16/902,947.
Non-Final Office Action dated Nov. 23, 2020 for U.S. Appl. No. 16/571,707.
Non-Final Office Action dated Dec. 20, 2018 for U.S. Appl. No. 15/944,442.
Non-final Office Action mailed in related U.S. Appl. No. 14/488,804 dated May 21, 2015.
Non-Final Office Action mailed in related U.S. Appl. No. 14/693,472, dated Jul. 20, 2015.
Non-Final Office Action dated Jun. 14, 2018 for U.S. Appl. No. 13/771,773.
Non-Final Office Action dated Oct. 25, 2016 for U.S. Appl. No. 13/771,773.
Non-Final Office Action dated Dec. 4, 2015 for U.S. Appl. No. 13/771,773.
Notice of Allowance dated Jan. 3, 2017 for U.S. Appl. No. 14/693,472.
Notice of Allowance dated Jan. 10, 2017 for U.S. Appl. No. 13/974,918.
Notice of Allowance dated Feb. 3, 2021 for U.S. Appl. No. 15/944,442.
Notice of Allowance dated Feb. 16, 2021 for U.S. Appl. No. 16/902,947.
Notice of Allowance dated Feb. 17, 2017 for U.S. Appl. No. 15/407,620.
Notice of Allowance dated Mar. 26, 2019 for U.S. Appl. No. 15/791,950.
Notice of Allowance dated Apr. 25, 2017 for U.S. Appl. No. 13/974,918.
Notice of Allowance dated Apr. 30, 2019 for U.S. Appl. No. 15/791,950.
Notice of Allowance dated May 8, 2017 for U.S. Appl. No. 14/693,472.
Notice of Allowance dated Jun. 30, 2017 for U.S. Appl. No. 15/407,620.
Notice of Allowance dated Aug. 8, 2017 for U.S. Appl. No. 13/974,918.
Notice of Allowance dated Aug. 13, 2019 for U.S. Appl. No. 15/791,950.
Notice of Allowance dated Aug. 18, 2017 for U.S. Appl. No. 14/693,472.
Notice of Allowance dated Aug. 18, 2017 for U.S. Appl. No. 15/407,620.
Notice of Allowance dated Aug. 26, 2016 for U.S. Appl. No. 14/693,472.
Notice of Allowance dated Sep. 22, 2016 for U.S. Appl. No. 13/974,918.
Notice of Allowance dated Dec. 14, 2018 for U.S. Appl. No. 15/791,950.
Notice of Allowance dated Jan. 29, 2016 for U.S. Appl. No. 14/488,804.
Notice of Allowance dated Feb. 20, 2020 for U.S. Appl. No. 13/771,773.
Notice of Allowance dated Aug. 20, 2015 for U.S. Appl. No. 14/488,804.
Notice of Allowance dated Sep. 27, 2019 for U.S. Appl. No. 13/771,773.
Notice of Allowance dated Dec. 18, 2015 for U.S. Appl. No. 14/488,804.

(56) References Cited

OTHER PUBLICATIONS

Notice of Appeal dated Mar. 26, 2019 for U.S. Appl. No. 14/693,584.
Final Office Action dated Jan. 20, 2016 for U.S. Appl. No. 14/693,472.
Final Office Action dated Aug. 8, 2019 for U.S. Appl. No. 15/944,442.
Final Office Action dated May 18, 2017 for U.S. Appl. No. 13/771,773.
Response to Final Office Action dated Jan. 20, 2016 dated Feb. 9, 2016 for U.S. Appl. No. 14/693,472.
Response to Final Office Action dated Jan. 20, 2016 dated Mar. 15, 2016 for U.S. Appl. No. 13/974,918.
Response to Final Office Action dated Aug. 8, 2019 dated Oct. 10, 2019 for U.S. Appl. No. 15/944,442.
Response to Final Office Action dated Aug. 14, 2018 dated Nov. 14, 2018 for U.S. Appl. No. 15/791,950.
Response to Final Office Action dated Nov. 9, 2020 dated Feb. 9, 2021 for U.S. Appl. No. 16/902,947.
Response to Final Office Action dated May 18, 2017 dated Aug. 18, 2017 for U.S. Appl. No. 13/771,773.
Response to Final Office Action dated May 19, 2016 dated Jul. 15, 2016 for U.S. Appl. No. 13/771,773.
Response to Final Office Action dated Oct. 2, 2017 dated Feb. 1, 2018 for U.S. Appl. No. 13/771,773.
Response to Final Office Action dated Dec. 27, 2018 dated Apr. 29, 2019 for U.S. Appl. No. 13/771,773.
Response to Non-Final Office Action dated Jan. 31, 2018 dated Apr. 30, 2018 for U.S. Appl. No. 15/791,950.
Response to Non-Final Office Action dated Mar. 18, 2016 dated May 13, 2016 for U.S. Appl. No. 14/693,472.
Response to Non-Final Office Action dated Apr. 7, 2016 dated Jun. 24, 2016 for U.S. Appl. No. 13/974,918.
Response to Non-final Office Action dated May 21, 2015 dated Aug. 3, 2015 U.S. Appl. No. 14/488,804.
Response to Non-Final Office Action dated Jun. 12, 2015 dated Oct. 8, 2015 for U.S. Appl. No. 13/974,918.
Response to Non-Final Office Action dated Jun. 24, 2020 dated Oct. 24, 2020 for U.S. Appl. No. 15/944,442.
Response to Non-Final Office Action dated Jul. 20, 2015 dated Oct. 13, 2015 for U.S. Appl. No. 14/693,472.
Response to Non-Final Office Action dated Jul. 24, 2020 dated Oct. 26, 2020 for U.S. Appl. No. 16/902,947.
Response to Non-Final Office Action dated Nov. 23, 2020 dated Apr. 21, 2021 for U.S. Appl. No. 16/571,707.
Response to Non-Final Office Action dated Dec. 20, 2018 dated Apr. 22, 2019 for U.S. Appl. No. 15/944,442.
Response to Non-Final Office Action dated Jun. 14, 2018 dated Nov. 6, 2018 for U.S. Appl. No. 13/771,773.
Response to Non-Final Office Action dated Oct. 25, 2016 dated Jan. 23, 2017 for U.S. Appl. No. 13/771,773.
Response to Non-Final Office Action dated Dec. 4, 2015 dated Feb. 10, 2016 for U.S. Appl. No. 13/771,773.
Response to Restriction/Election mailed Aug. 2, 2018 dated Sep. 20, 2018 for U.S. Appl. No. 15/944,442.
Response to Restriction/Election mailed Aug. 12, 2015 dated Nov. 9, 2015 for U.S. Appl. No. 13/771,773.
Response to Restriction/Election mailed Dec. 18, 2014 dated Jan. 19, 2015 for U.S. Appl. No. 14/488,804.
Restriction/Election mailed Aug. 2, 2018 for U.S. Appl. No. 15/944,442.
Restriction/Election dated Aug. 12, 2015 for U.S. Appl. No. 13/771,773.
Restriction/Election dated Dec. 18, 2014 for U.S. Appl. No. 14/488,804.
Final Office Action dated Aug. 14, 2018 for U.S. Appl. No. 15/791,950.
Final Office Action dated Nov. 9, 2020 for U.S. Appl. No. 16/902,947.
U.S. Appl. No. 09/904,058, filed Jul. 11, 2011, now U.S. Patent No. 6,694,537.
U.S. Appl. No. 14/693,584, filed Apr. 22, 2015, Final Office Action dated May 19, 2016.
U.S. Appl. No. 14/693,584, filed Apr. 22, 2015, Final Office Action dated Jul. 28, 2017.
U.S. Appl. No. 14/693,584, filed Apr. 22, 2015, Final Office Action dated Dec. 27, 2018.
U.S. Appl. No. 14/693,584, filed Apr. 22, 2015, Non-Final Office Action dated Jun. 5, 2018.
U.S. Appl. No. 14/693,584, filed Apr. 22, 2015, Non-Final Office Action dated Dec. 3, 2015.
U.S. Appl. No. 14/693,584, filed Apr. 22, 2015, Non-Final Office Action dated Dec. 14, 2016.
U.S. Appl. No. 14/693,584, filed Apr. 22, 2015, Notice of Allowance dated Jan. 24, 2020.
U.S. Appl. No. 14/693,584, filed Apr. 22, 2015, Notice of Allowance dated Oct. 1, 2019.
U.S. Appl. No. 14/693,584, filed Apr. 22, 2015, Response to Final Office Action dated May 19, 2016 dated Jul. 15, 2016.
U.S. Appl. No. 14/693,584, filed Apr. 22, 2015, Response to Final Office Action dated Jul. 28, 2017 dated Oct. 23, 2017.
U.S. Appl. No. 14/693,584, filed Apr. 22, 2015, Response to Non-Final Office Action dated Jun. 5, 2018 dated Oct. 5, 2018.
U.S. Appl. No. 14/693,584, filed Apr. 22, 2015, Response to Non-Final Office Action dated Dec. 3, 2015 dated Jan. 19, 2016.
U.S. Appl. No. 14/693,584, filed Apr. 22, 2015, Response to Non-Final Office Action dated Dec. 14, 2016 dated Apr. 14, 2017.
U.S. Appl. No. 14/693,584, filed Apr. 22, 2015, Response to Restriction/Election dated Jul. 10, 2015 dated Oct. 8, 2015.
U.S. Appl. No. 14/693,584, filed Apr. 22, 2015, Restriction/Election dated Jul. 10, 2015.

* cited by examiner

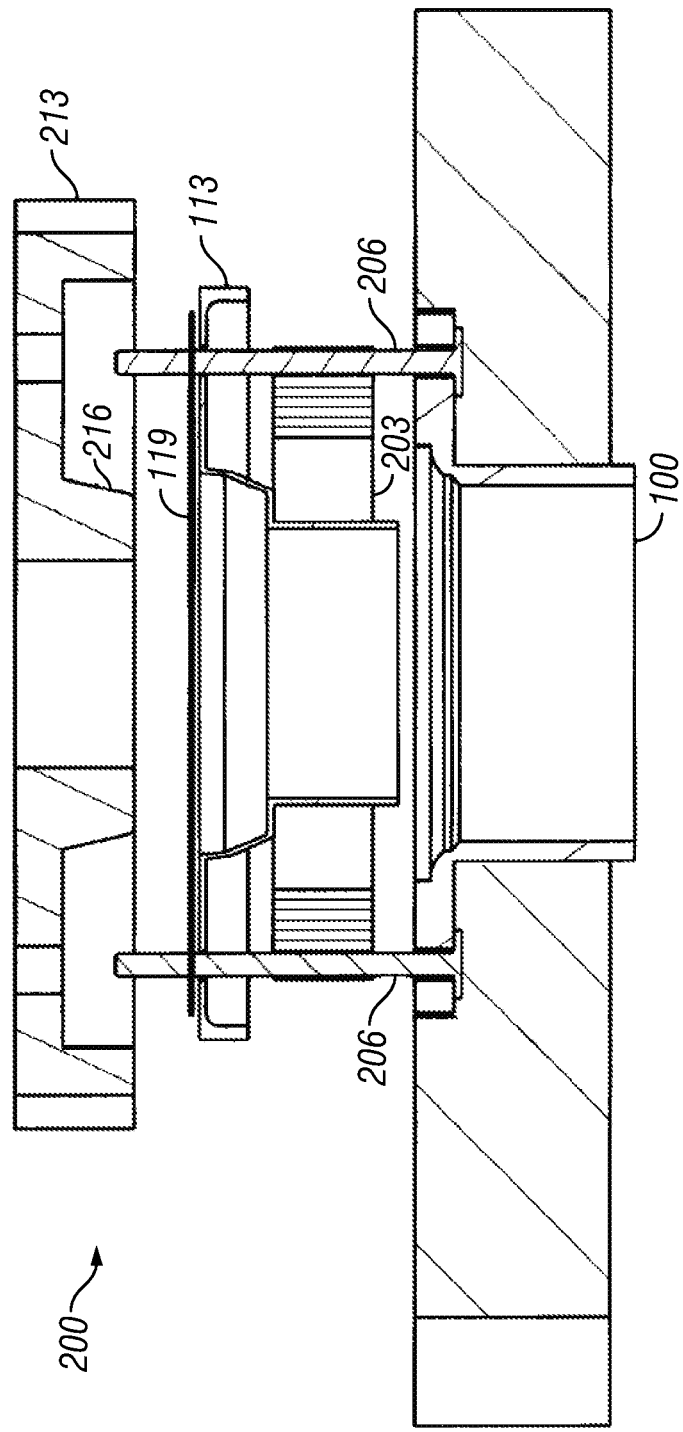

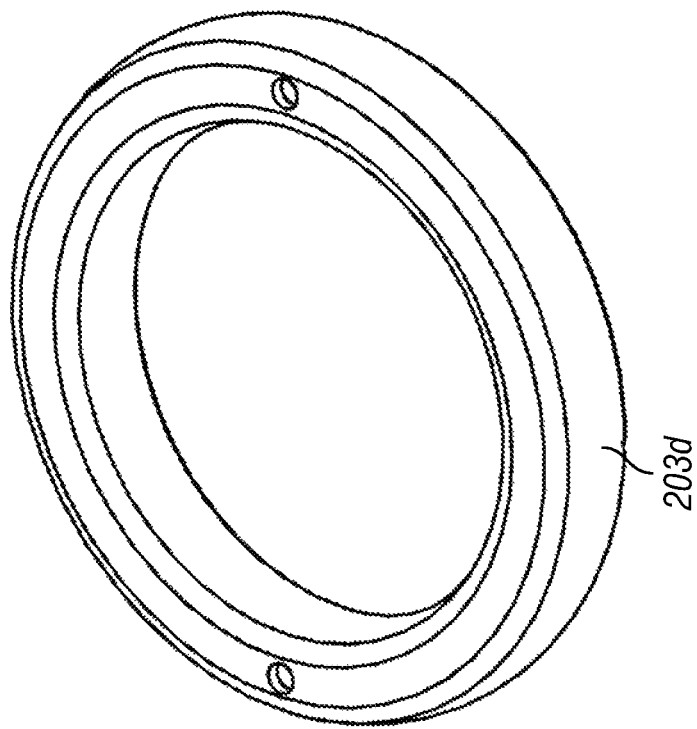
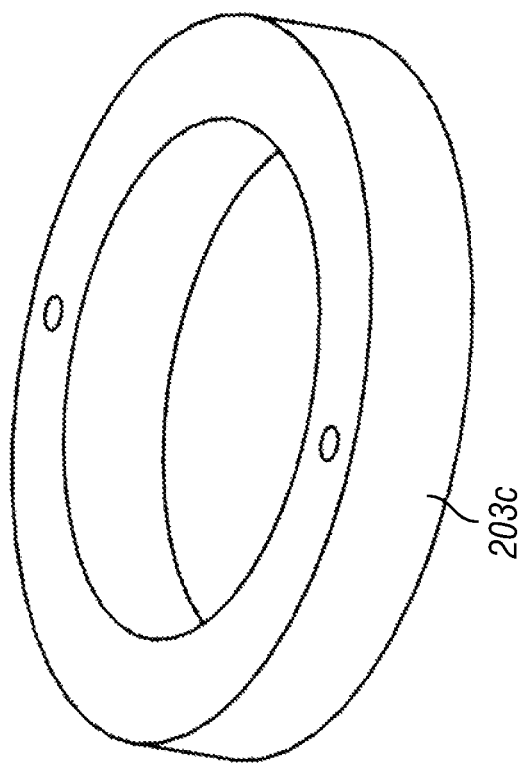
FIG. 9

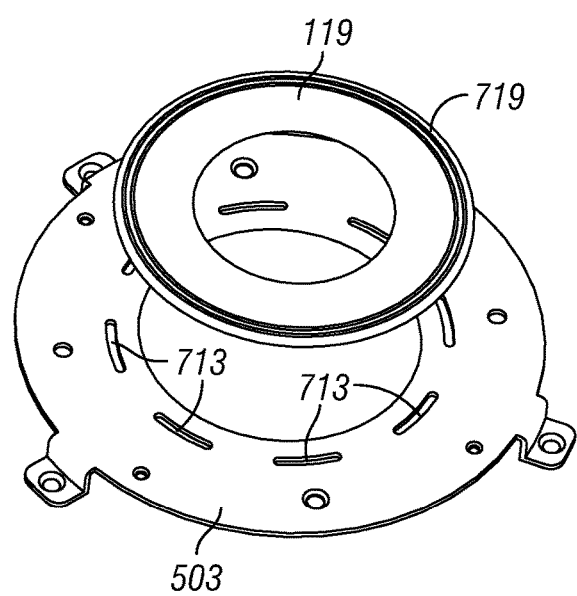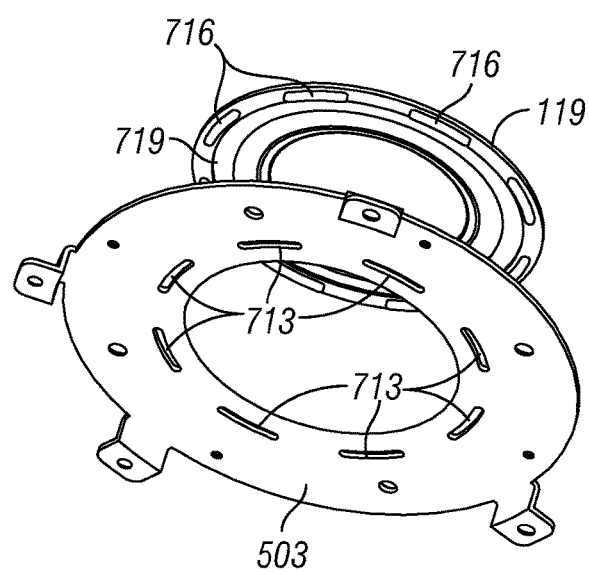
*FIG. 23A*  *FIG. 23B*

CLOSET COLLAR APPARATUS AND SYSTEMS

CROSS-REFERENCE TO RELATED CASES

This application is a continuation of, and claims priority to, co-pending U.S. Utility Patent Applications entitled "CLOSET COLLAR ADAPTATIONS" filed on Feb. 20, 2013 and assigned application Ser. No. 13/771,773, which claims priority to both U.S. Provisional Patent Applications titled "CLOSET COLLAR ADAPTATION" filed on Feb. 20, 2012 and assigned application No. 61/600,794 and U.S. Provisional Patent Applications titled "CLOSET COLLAR ADAPTATION" filed on Jul. 2, 2012 and assigned application No. 61/667,377. This application is also a continuation of, and claims priority to, co-pending U.S. Utility Patent Applications entitled "TOILET SEALS" filed on Apr. 3, 2018 and assigned application Ser. No. 15/944,442, which is a continuation of U.S. Utility patent application Ser. No. 13/771,773, filed on Feb. 20, 2013, which claims priority to both U.S. Provisional Patent Application No. 61/600,794, filed on Feb. 20, 2012, and U.S. Provisional Patent Application No. 61/667,377, filed on Jul. 2, 2012. Each of these applications is incorporated by reference herein in its entirety.

BACKGROUND

A closet collar may provide a connection between a toilet and a drain pipe. Closet collars can be installed improperly making it difficult to install a toilet without a leaky seal.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIGS. 3-5 are drawings showing an example of a closet collar adaptation assembly according to various embodiments of the present disclosure.

FIGS. 9 and 10A-10B are drawings showing examples of flexible seal rings that may be used with a closet collar adaptation assembly according to various embodiments of the present disclosure.

FIGS. 23A-23E are drawings of another embodiment of a sealing washer for a closet collar adaptation assembly according to various embodiments of the present disclosure.

DETAILED DESCRIPTION

Figure 1A:
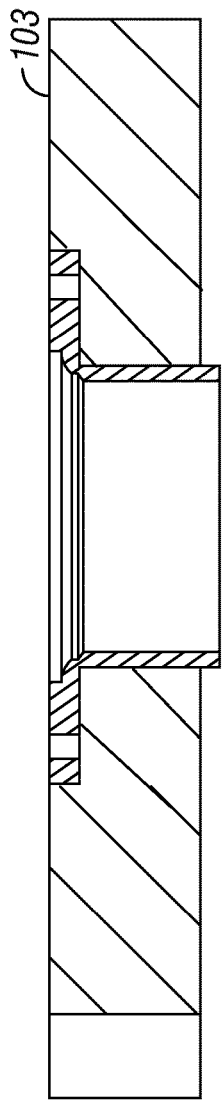
FIGS. 1A-1C are drawings showing examples of a closet collar according to various embodiments of the present disclosure.
Figure 1B:
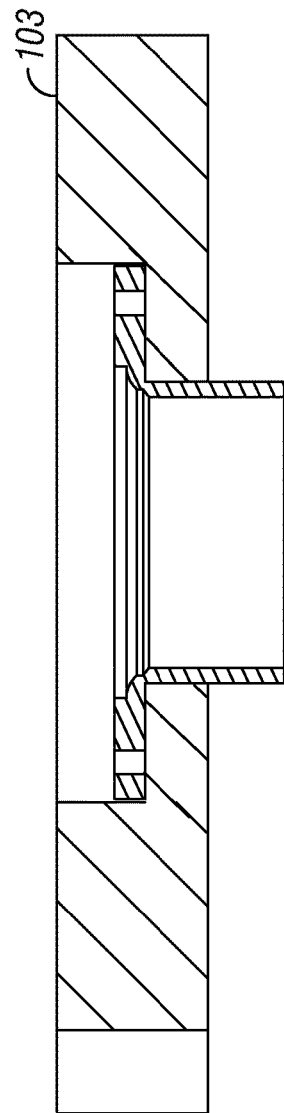
Figure 1C:
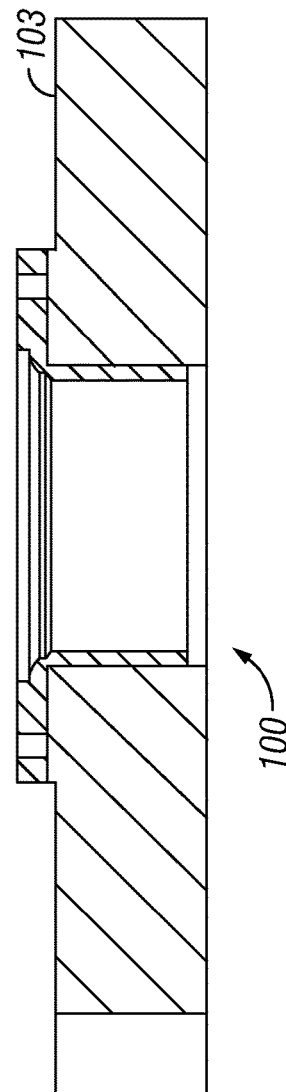

With reference to FIGS. 1A, 1B, and 1C, shown are examples of closet collars 100 upon which toilets may be installed. The closet collars 100 provide the drain point for a toilet where sewage leaves the toilet and is provided to a sewage system as can be appreciated. The closet collars 100 are shown relative to flooring 103. In the embodiment of FIG. 1A, the closet collar 100 is recessed with respect to the flooring 103 so that the upper surface of the closet collar 100 is flush with the surface of the flooring 103. Such may occur, for example, where the closet collar 100 is installed on subflooring and then finished flooring 103 is installed around the closet collar 100. For example, ceramic tile or other types of a flooring 103 may be installed on subflooring and result in the upper surface of the closet collar 100 being flush with the surface of the flooring 103. Referring to FIG. 1B, shown is a situation in which the closet collar 100 is recessed with respect to the flooring 103 such that the top surface of the closet collar 100 is below the top surface of the flooring 103. Such may occur, for example, where the closet collar 100 is installed onto subflooring and then finished flooring having a relatively large thickness is installed around it. With reference to FIG. 1C, shown is a situation in which the closet collar 100 is installed on top of the flooring 103. In the embodiment of FIG. 1C, the top surface of the closet collar 100 is above the top surface of the flooring 103. As contemplated herein, the closet collar 100 in any given installation might fall within any one of the configurations described with reference to FIG. 1A, 1B, or 1C.

Figure 2A:
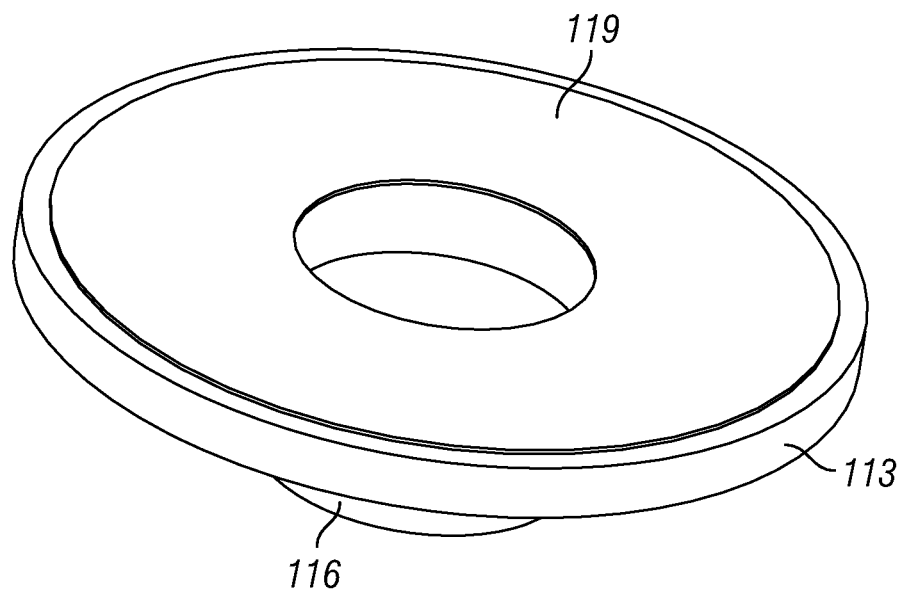
FIGS. 2A-2C are drawings showing examples of a closet collar adapter according to various embodiments of the present disclosure.
Figure 2B:
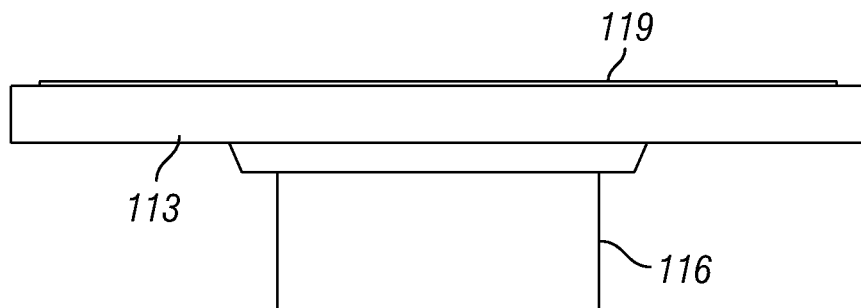
Figure 2C:
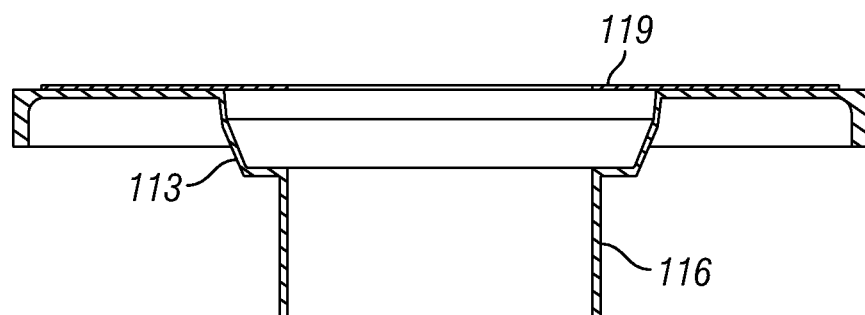

With reference to FIGS. 2A, 2B, and 2C, shown is an example of a closet collar adapter 113 according to various embodiments. A closet collar adapter 113 includes a pipe extension 116 that is configured to extend down into a closet collar 100 (FIGS. 1A-1C). Also, a sealing washer 119 may be disposed on top of the closet collar adapter 113. According to various embodiments, the sealing washer 119 may be affixed to an upper surface of the closet collar adapter 113 by way of an appropriate adhesive, for example, thereby forming a sealed junction between the sealing washer 119 and the upper surface of the closet collar adapter 113. In alternative embodiments, the sealing washer 119 may be affixed to the upper surface of the closet collar adapter 113 by being overmolded or by using any other suitable process. In further alternative embodiments, the sealing washer 119 and the closet collar adapter 113 may be integrally molded as a single part. The sealing washer 119 may be made from rubber or other appropriate material that facilitates an appropriate seal with a horn extending from the underside of a toilet as will be described.

With reference to FIG. 3, shown is an example of a closet collar adaptation assembly 200 according to various embodiments of the present disclosure. According to various embodiments, the closet collar adaptation assembly 200 may include the closet collar adapter 113, a flexible seal ring 203, one or more anchor bolts 206, the sealing washer 119, and possibly other components. The closet collar adapter 113 may mount to and form a seal with the closet collar 100. Although the embodiment of FIG. 3 shows the components of the closet collar adaptation assembly 200 as being separate components, in alternative embodiments, one or more of the components of the adaptation assembly 200 may be integrally molded as a single component. In further alternative embodiments, one or more of the components of the closet collar adaptation assembly 200 may be bonded to form a single component using, for example, an overmolding process or any other suitable method.

Positioned above the closet collar adaptation assembly 200 is the bottom of a toilet 213 that includes the horn 216. The horn 216 of the toilet 213 mates with the closet collar adaptation assembly 200 to form a seal between the horn 216 and the closet collar 100. The seal between the horn 216 and the closet collar adaptation assembly 200 facilitates the passage of sewage matter from the toilet 213 through the closet collar 100 and down the drain pipe as can be appreciated.

The flexible seal ring 203 may be made of a material that facilitates the flexible seal ring 203 flexing and at least partially collapsing with pressure, thereby forming a seal between the underside of the closet collar adapter 113 and the sealing surface of the closet collar 100. In alternative embodiments, a wax ring may be used instead of or in addition to the flexible seal ring 203. Such a flexible seal ring 203 may be made of, for example, neoprene, foam rubber, polyvinylchloride (PVC) rubber, thermoplastic elastomer (TPE), thermoplastic rubber (TPR), styrene-butadiene rubber (SBR), ethylene propylene diene monomer (EPDM) rubber, or any other material that facilitates the flexible seal ring 203 at least partially collapsing and sealing against the respective surfaces. These materials may facilitate the flexible seal ring 203 being reusable, unlike a wax ring which typically is made for a single use. In this sense, when the toilet 213 and/or the closet collar adaptation assembly 200 is removed, the flexible seal ring 203 may return at least partially to the shape in which it was prior to the toilet 213 and/or the closet collar adaptation assembly 200 causing the flexible seal ring 203 to at least partially collapse. Additionally, the flexible seal ring 203 may comprise an antimicrobial material. For example, the flexible seal ring 203 may comprise an antimicrobial coating.

Additionally, the material selected for the flexible seal ring 203 may be chosen so that it may withstand the corrosive effects of the sewage gases and matter that flows from the toilet 213 into the drain through the closet collar 100 as can be appreciated. The closet collar adaptation assembly 200 is shown in FIG. 3 using an exploded view in which components have not yet been completely assembled.

Figure 4:
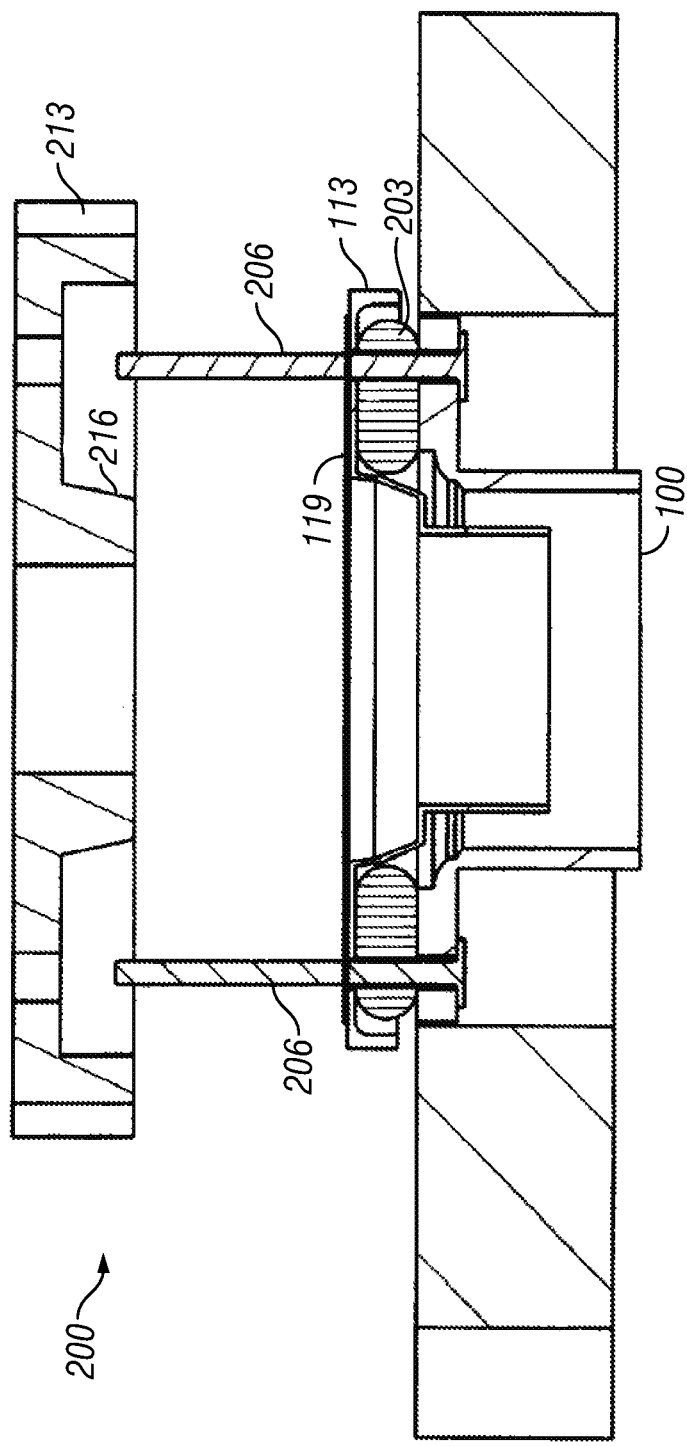

Referring to FIG. 4, shown is the closet collar adaptation assembly 200 in which the closet collar adapter 113 has been pushed down onto the flexible seal ring 203, thereby compressing the flexible seal ring 203 as shown. The sealing washer 119 is disposed at the top of the closet collar adapter 113 and includes a hole through which the horn 216 of the toilet 213 protrudes. The sealing washer 119 may thereby form a seal with the sides of the horn 216 to prevent sewage gases or other matter from escaping during the toilet flush cycle or at other times. The anchor bolts 206 may be restricted to the closet collar 100 in holes or slots that are typically found within closet collars 100 as can be appreciated.

Figure 5:
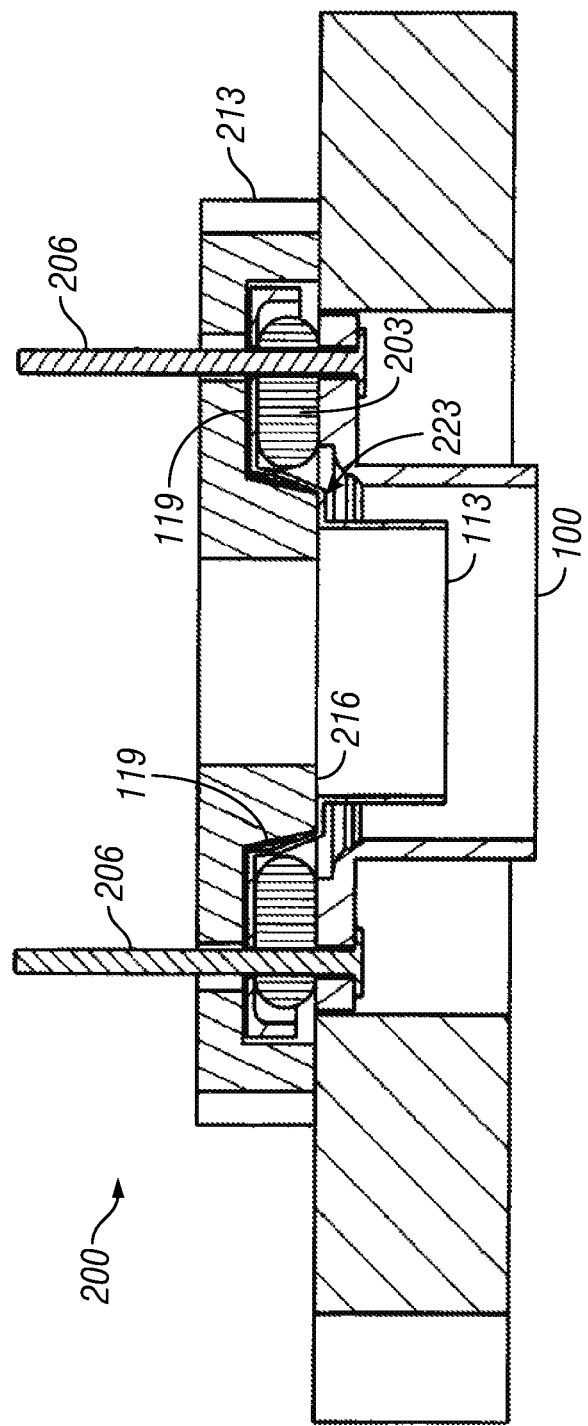

With reference to FIG. 5, shown is an example of the closet collar adaptation assembly 200 in which the toilet 213 has been placed over the closet collar adaptation assembly 200 and the horn 216 has been pressed through the center opening of the sealing washer 119. As shown, the sealing washer 119 may be stretched down around the sides of the horn 216, thereby forming a seal between the side of the horn 216 and the sealing washer 119. In addition, wax may be provided at strategic locations inside the closet collar adapter 113 so that the sides of the horn 216 may come into contact with the wax to form a seal in addition to, or as an alternative to, the use of the sealing washer 119. For example, such wax may be placed in the corner 223 or in other locations formed in the closet collar adapter 113. As a result, the wax may contact a portion of the horn 216 to further form a seal between the horn 216 and closet collar adapter 113. In alternative embodiments, the side walls of the closet collar adapter 113 may be shaped to provide for holding areas or reservoirs in which wax or other sealants may be retained. When the horn 216 is inserted into closet collar adapter 113, the wax or other sealants in the holding areas or reservoirs may come into contact with the horn 216. The holding areas or reservoirs may provide for greater precision in terms of sealing to prevent sewage leaks and may also facilitate assembly and/or installation of the closet collar adaptation assembly 200.

Figure 6:
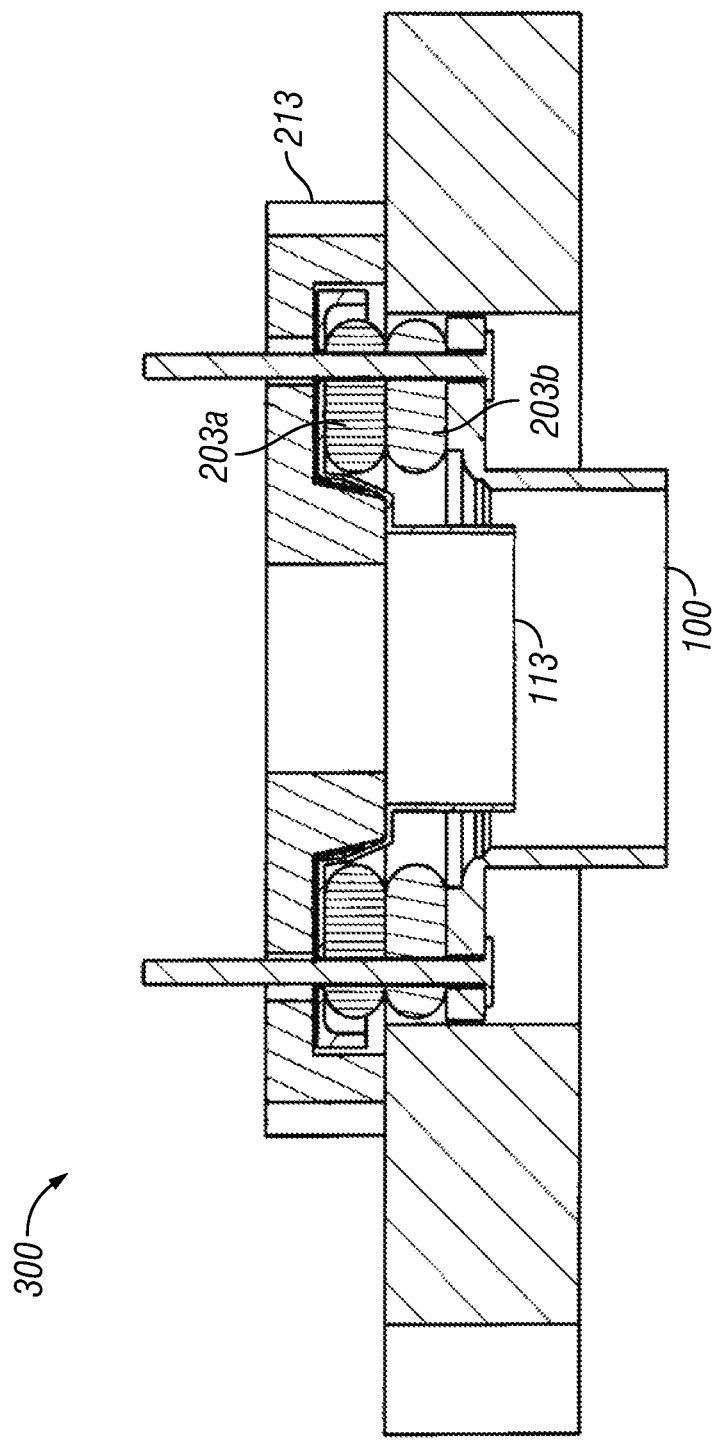
FIG. 6 is a drawing showing another example of a closet collar adaptation assembly according to various embodiments of the present disclosure.

With reference to FIG. 6, shown is a closet collar adaptation assembly 300 according to another embodiment of the present disclosure. The closet collar adaptation assembly 300 is similar to the closet collar adaptation assembly 200 described above, with the exception that the closet collar adaptation assembly 300 shown in FIG. 6 includes multiple flexible seal rings 203a and 203b that are sandwiched together as shown. In the embodiment shown in FIG. 6, the closet collar adaptation assembly 300 includes two flexible seal rings 203a and 203b. However, fewer or greater quantities of flexible seal rings 203a and 203b may be used in alternative embodiments. Having multiple flexible seal rings 203a and 203b may provide a proper seal between the closet collar adapter 113 and the closet collar 100 when the closet collar 100 is recessed relatively far down in the flooring 103 (FIG. 1) as can be appreciated.

Figure 7:
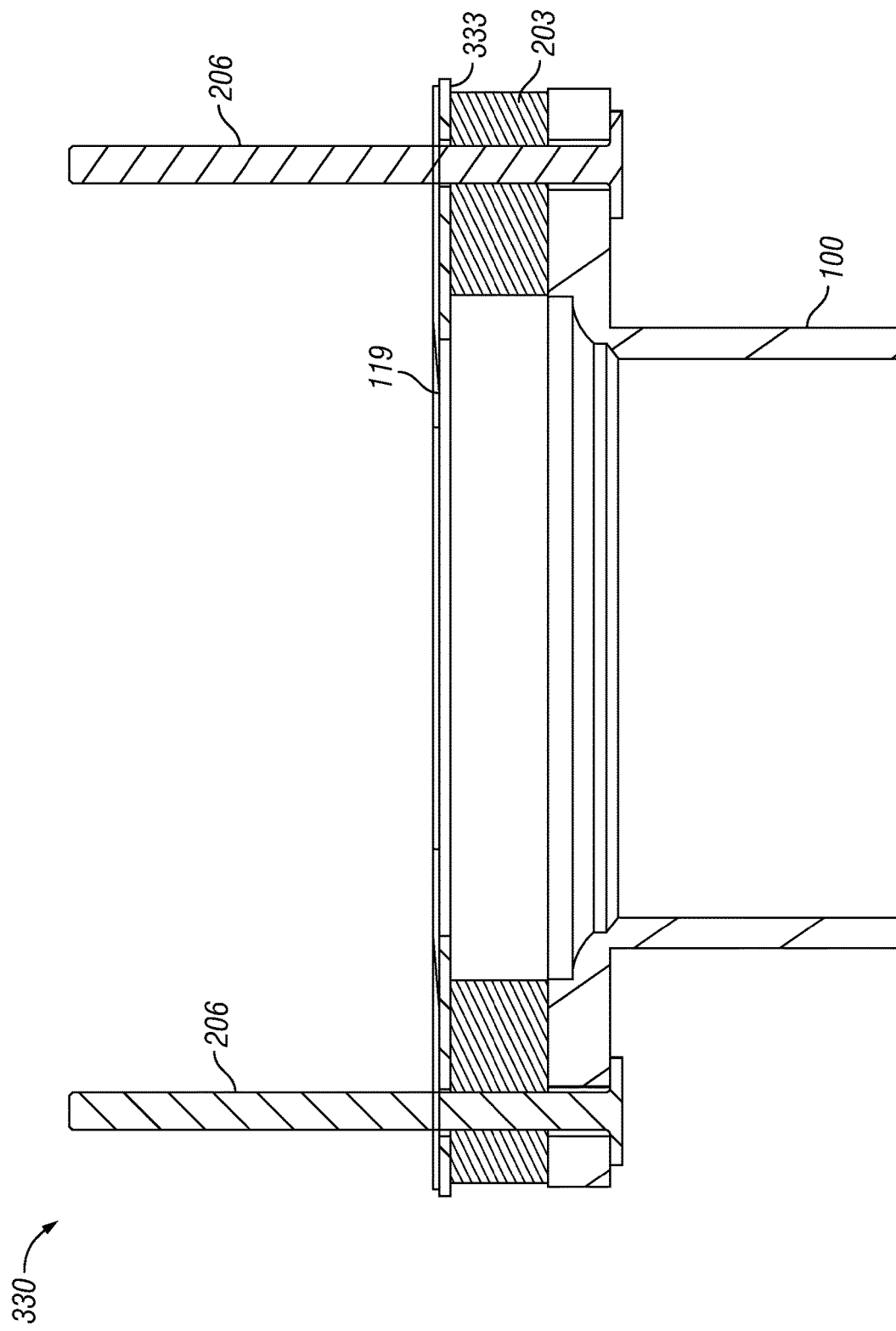
FIG. 7 is a drawing showing another example of a closet collar adaptation assembly according to various embodiments of the present disclosure.

With reference to FIG. 7, shown is another example of a closet collar adaptation assembly 330 according to various embodiments. The closet collar adaptation assembly 330 in the embodiment of FIG. 7 includes an adapter plate 333 that includes a hole through which the horn 216 (FIG. 3) of a toilet may protrude. The sealing washer 119 may be affixed to the top of the adapter plate 333 and may form a sealed joint therebetween. The flexible seal ring 203 is disposed between the adapter plate 333 and the closet collar 100 as shown. The horn 216 of a toilet may be positioned to extend through the sealing washer 119 and the inner hole of the adapter plate 333, thereby forming a seal between the sides of the horn 216 of the toilet, as described above, via the sealing washer 119. Thus, the closet collar adaptation assembly 330 provides for the installation of a toilet 213 without the use of the closet collar adapter 113 described above.

Although the embodiment of FIG. 7 shows the components of the closet collar adaptation assembly 330 as being separate components, in alternative embodiments, one or more of the components of the adaptation assembly 330 may be integrally molded as a single component. In further alternative embodiments, one or more of the components of the closet collar adaptation assembly 330 may be bonded to form a single component using, for example, an overmolding process or any other suitable method. For example, the sealing washer 119 may be overmolded to the adapter plate 333 in various embodiments.

Figure 8:
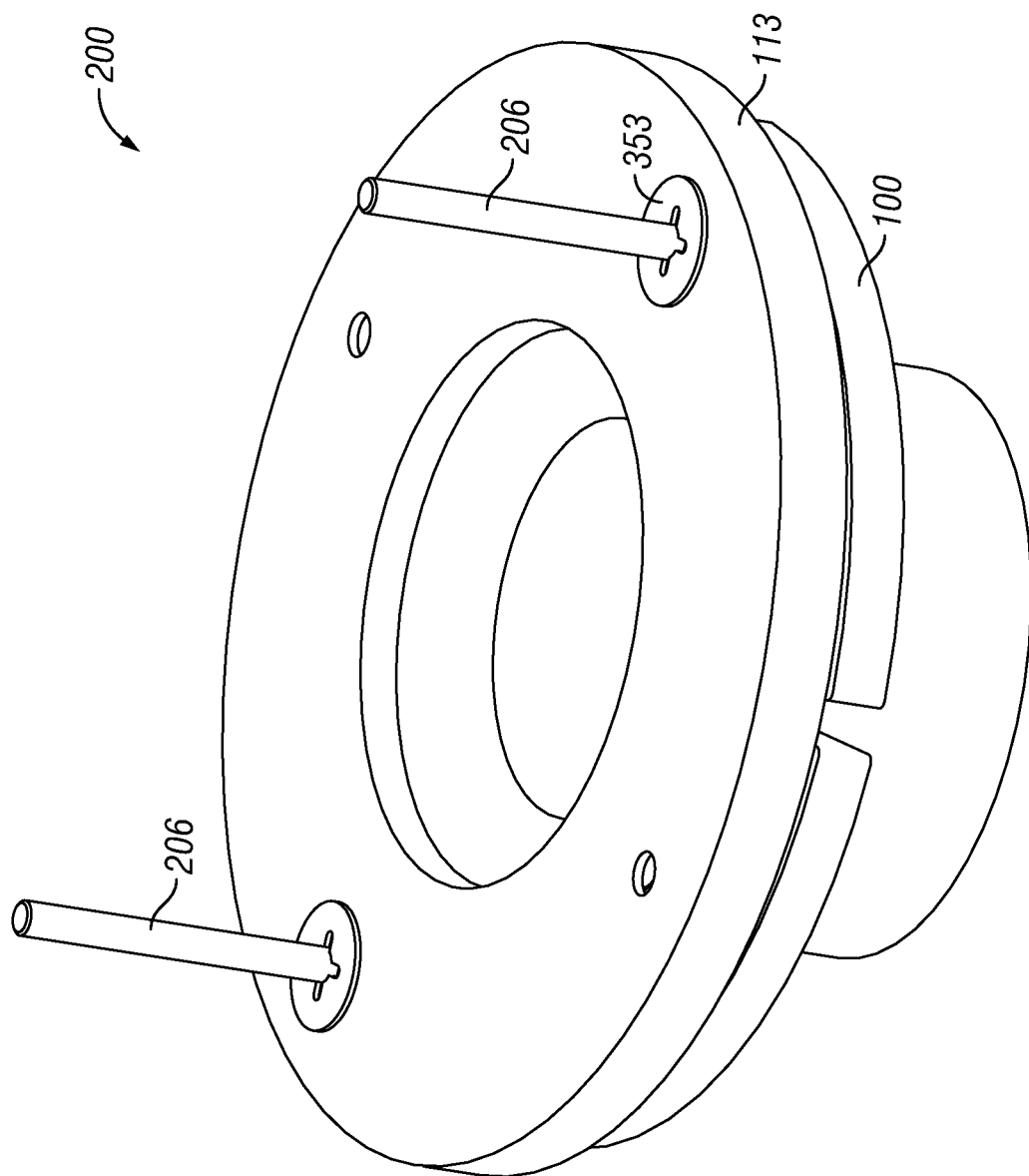
FIG. 8 is a drawing showing an example of clips that may be used with a closet collar adaptation assembly according to various embodiments of the present disclosure.

Referring next to FIG. 8, shown is a view of an example of clips 353 that may be used with various closet collar adaptation assemblies 200 according to various embodiments. In FIG. 8, the clips 353 are shown being used with the closet collar adaptation assembly 200. In alternative embodiments, the clips 353 may be used with the closet collar adaptation assembly 300 (FIG. 6), the closet collar adaptation assembly 330 (FIG. 7), or with other embodiments. The clips 353 may be slid onto the anchor bolts 206 so that they make contact with the sealing washer 119 (FIG. 2) that is disposed on top of the closet collar adapter 113. The clips 353 may be pushed down such that the flexible seal ring (not shown) is compressed by the clips 353 to hold the closet collar adaptation assembly 200 and to hold the anchor bolts 206 in place, thereby facilitating the toilet 213 (FIG. 3) being positioned over the closet collar adaptation assembly 200.

Referring to FIG. 9, shown are two examples of the flexible seal ring 203, denoted here as flexible seal ring 203c and flexible seal ring 203d. The flexible seal ring 203c may comprise foam rubber, PVC rubber, neoprene, or other types of sealing materials. Such materials may be antimicrobial according to various embodiments. Additionally, the flexible seal ring 203 according to various embodiments may comprise a coating, such as an antimicrobial coating. The flexible seal ring 203d may be manufactured from extruded rubber or other types of suitable materials as can be appreciated.

Figure 10A:
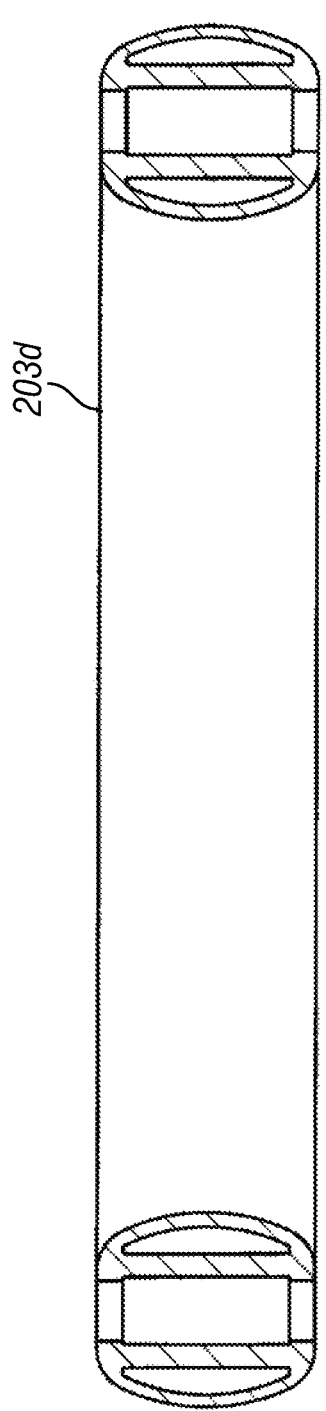
Figure 10B:
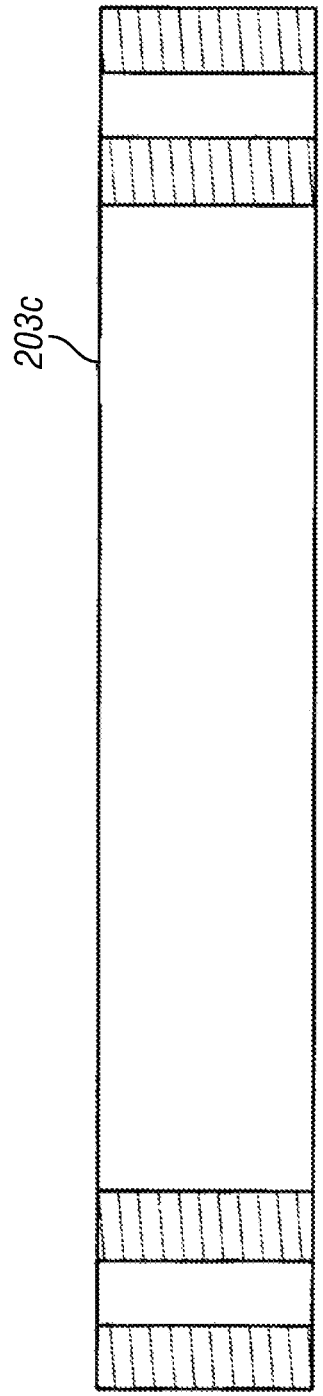
Figure 11:
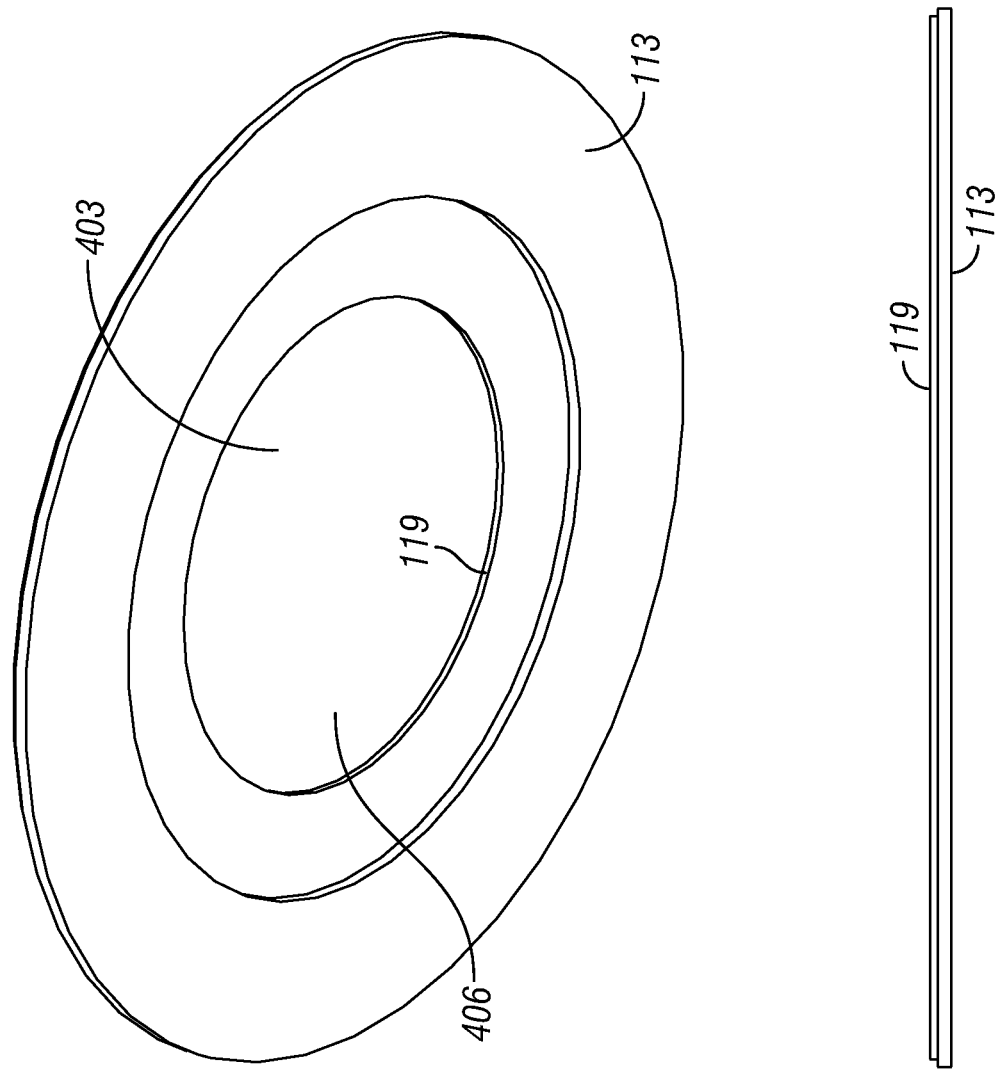
FIGS. 11-14 are drawings showing an example of a sealing washer that may be used with a closet collar adaptation assembly according to various embodiments of the present disclosure.
Figure 12:
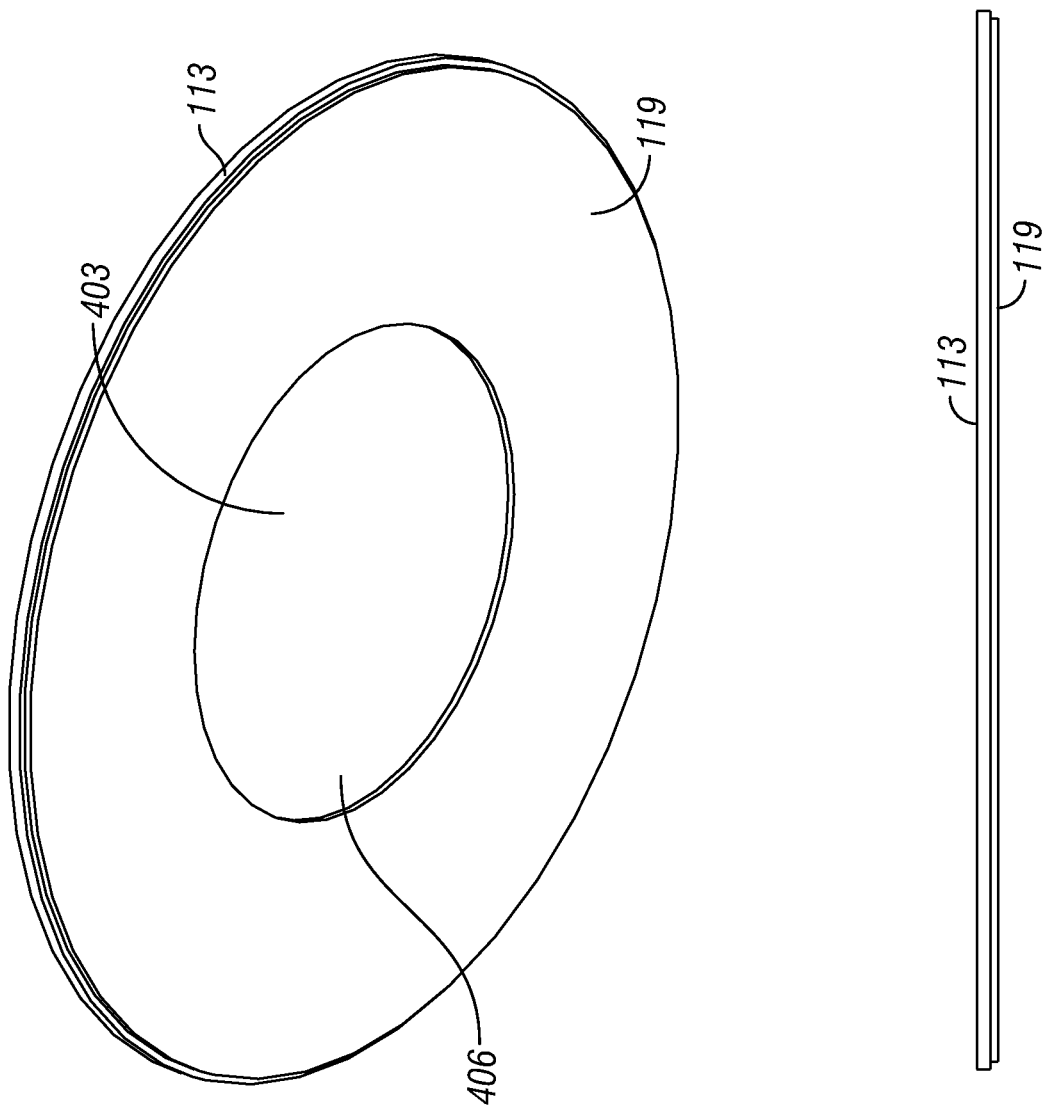
Figure 13:
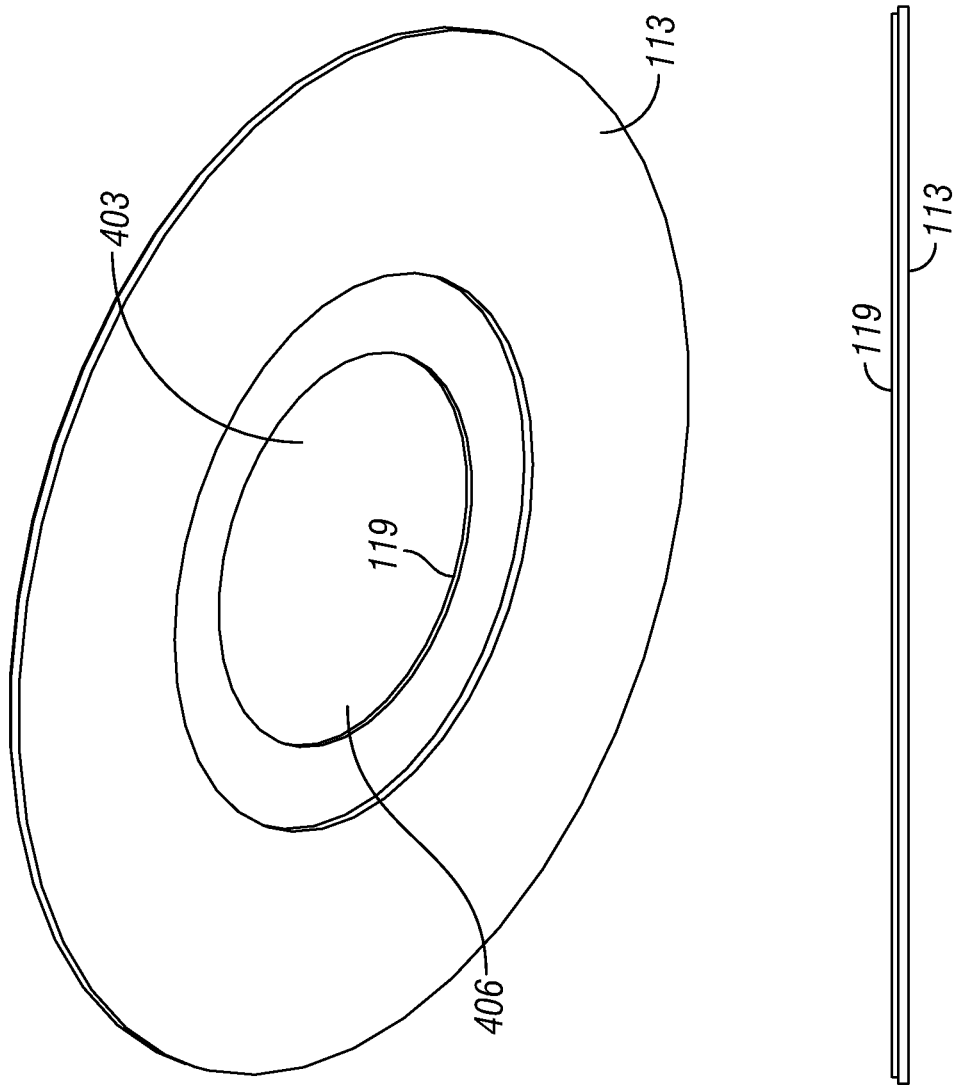
Figure 14:
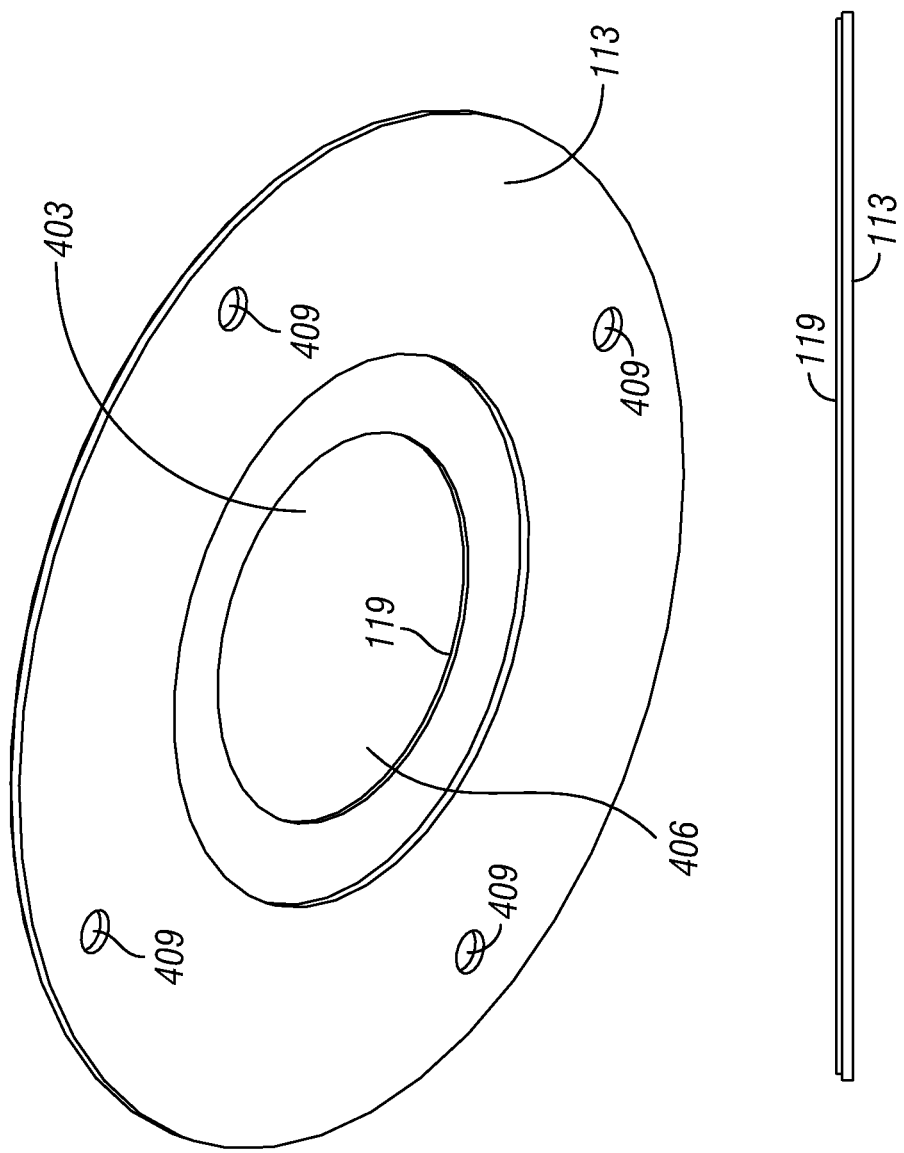

Referring next to FIGS. 10A and 10B, shown are cross-sectional views of the flexible seal rings 203c and 203d. As shown, the flexible seal ring 203d has several walls that may facilitate the flexible seal ring 203d at least partially collapsing when compressed. The flexible seal ring 203c comprises a material that may facilitate the flexible seal ring 203c at least partially collapsing to form the appropriate seals as can be appreciated.

With reference to FIGS. 11, 12, 13, and 14, shown is the sealing washer 119 positioned on the upper flat surface of the closet collar adapter 113 according to various embodiments. In the embodiments of FIGS. 11, 12, 13, and 14, the sealing washer 119 comprises a center hole 403 with a radius that is less than the radius of the opening 406 for the closet collar adapter 113. According to various embodiments, the closet collar adapter 113 may comprise one or more holes 409 through which bolts, screws, or any other suitable type of fasteners may insert to hold at least portions of the system down as can be appreciated.

Figure 15:
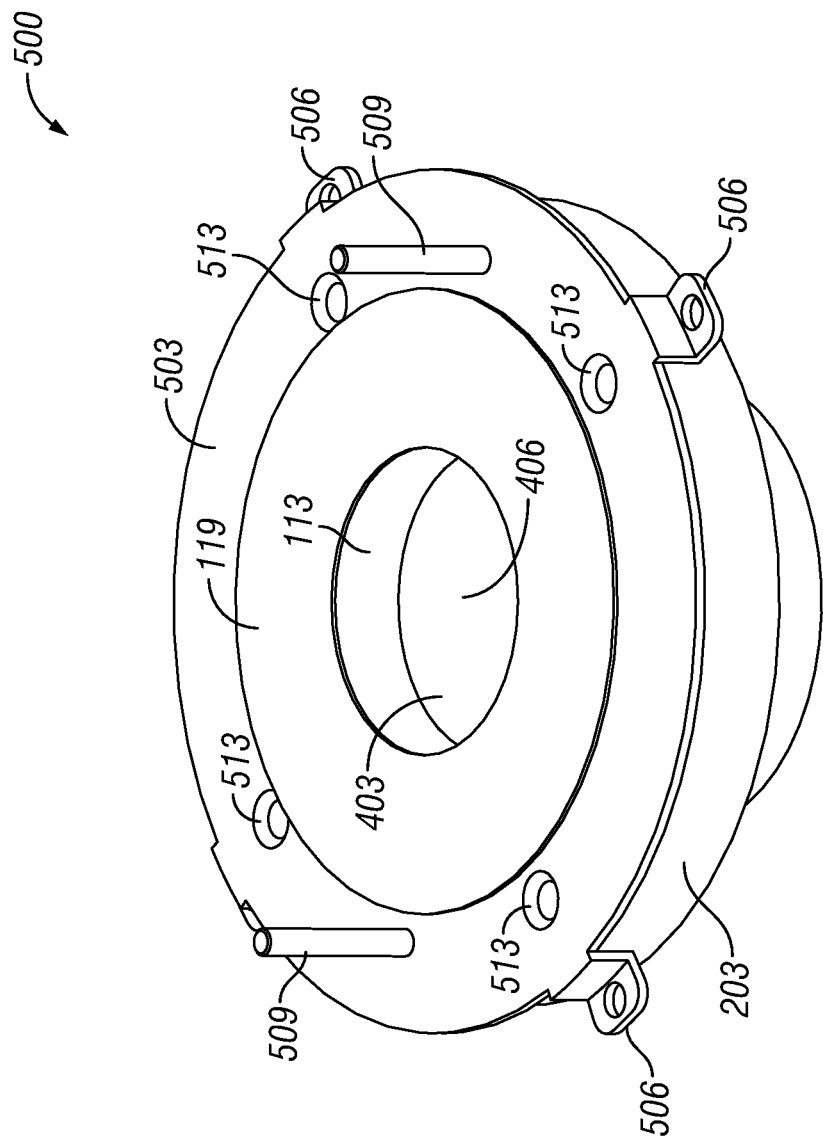
FIG. 15 is a drawing showing another example of a closet collar adaptation assembly according to various embodiments of the present disclosure.

Referring next to FIG. 15, shown is another example of a closet collar adaptation assembly 500 according to various embodiments. The closet collar adaptation assembly 500 in the embodiment of FIG. 15 includes the sealing washer 119 and the closet collar adapter 113. In addition, disposed over the closet collar adapter 113 is an adapter plate 503. The adapter plate 503 may be constructed of steel, aluminum, or other metal as can be appreciated. In alternative embodiments, the adapter plate 503 may be constructed of plastic, for example, or any other type of suitable material. The adapter plate 503 according to various embodiments may also comprise an integrated antimicrobial agent. Additionally or alternatively, various embodiments of the adapter plate 503 may include an antimicrobial coating, such as an antimicrobial paint, an antimicrobial metal powder coating, or any other type of finish.

Although the embodiment of FIG. 15 shows the components of the closet collar adaptation assembly 500 as being separate components, in alternative embodiments, one or more of the components of the adaptation assembly 500 may be integrally molded as a single component. In further alternative embodiments, one or more of the components of the closet collar adaptation assembly 500 may be bonded to form a single component using, for example, an overmolding process or any other suitable method. For example, the sealing washer 119, the closet collar adapter 113, and/or other components may be overmolded to the adapter plate 503 in various embodiments.

The adapter plate 503 may include one or more legs 506 that can be used to fasten the adapter plate 503 to the flooring 103 (FIG. 1A), thereby holding the closet collar adaptation assembly 500 in proper position with respect to the closet collar 100 (FIG. 1A). It may be that the feet of the legs 506 come into contact with the flooring 103, or they might be suspended above the flooring 103 such that a screw or bolt rigidly adheres the legs 506 to the flooring 103.

Protruding from the adapter plate 503 are bolts 509 that may be, for example, affixed directly to the adapter plate 503 according to various embodiments. The bolts 509 may insert into corresponding holes in the toilet 213 (FIG. 3) and be used to fasten the toilet 213 to the closet collar adaptation assembly 500. The flexible seal ring 203 may be disposed under the closet collar adapter 113 as described above. The adapter plate 503 may provide greater stability in that it may be attached to the flooring 103 around the closet collar 100 for cases, for example, where the closet collar 100 may be broken or otherwise compromised. In addition, screws may be used to affix the adapter plate 503 to the floor structure through the holes 513 as shown. Such screws may protrude through the flexible seal ring 203 according to various embodiments.

Figure 16:
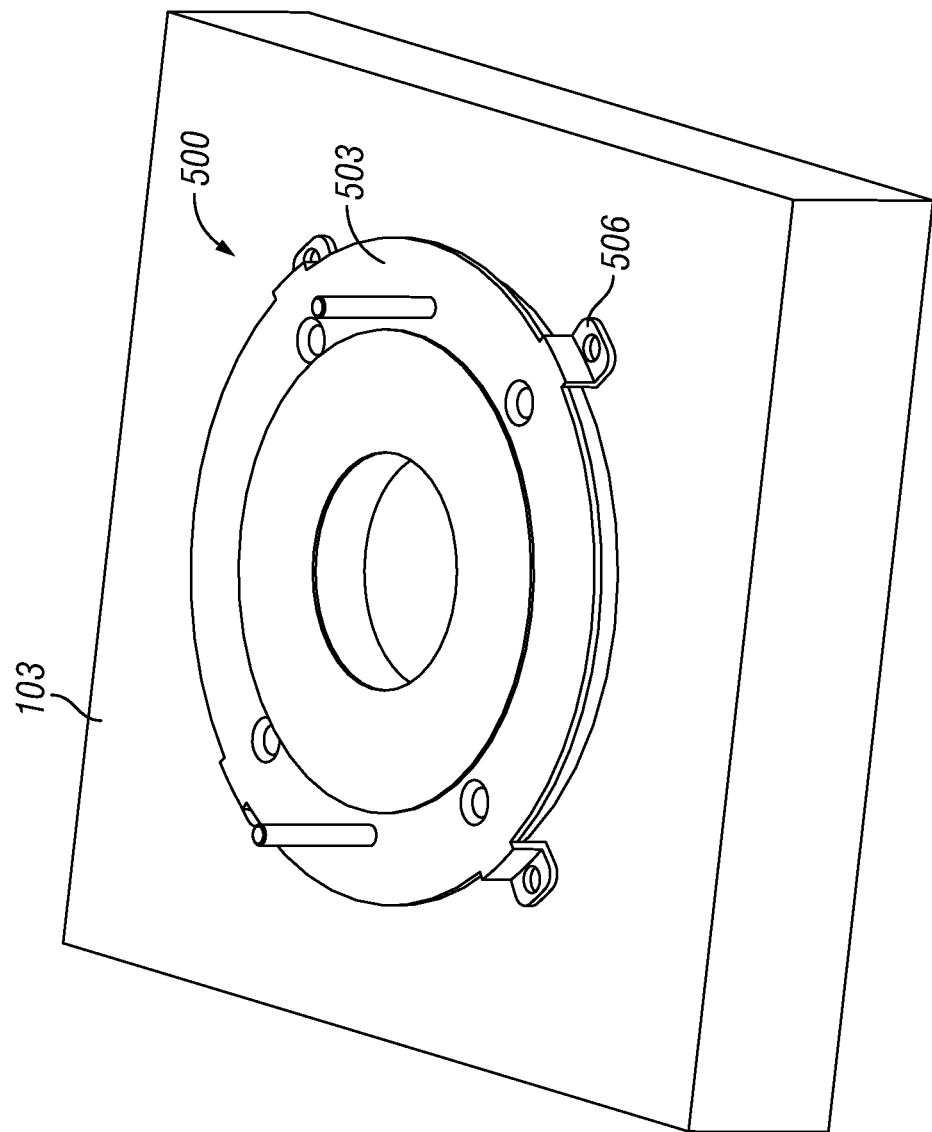
FIG. 16 is a drawing showing another example of a closet collar adaptation assembly according to various embodiments of the present disclosure.

With reference to FIG. 16, shown is an example of the closet collar adaptation assembly 500 after it has been installed over a closet collar 100 (not visible) such that the legs 506 come into contact with flooring 103. By bolting the adapter plate 503 to the flooring 103, greater stability of the connection between the toilet and the closet collar 100 may be provided.

Figure 17:
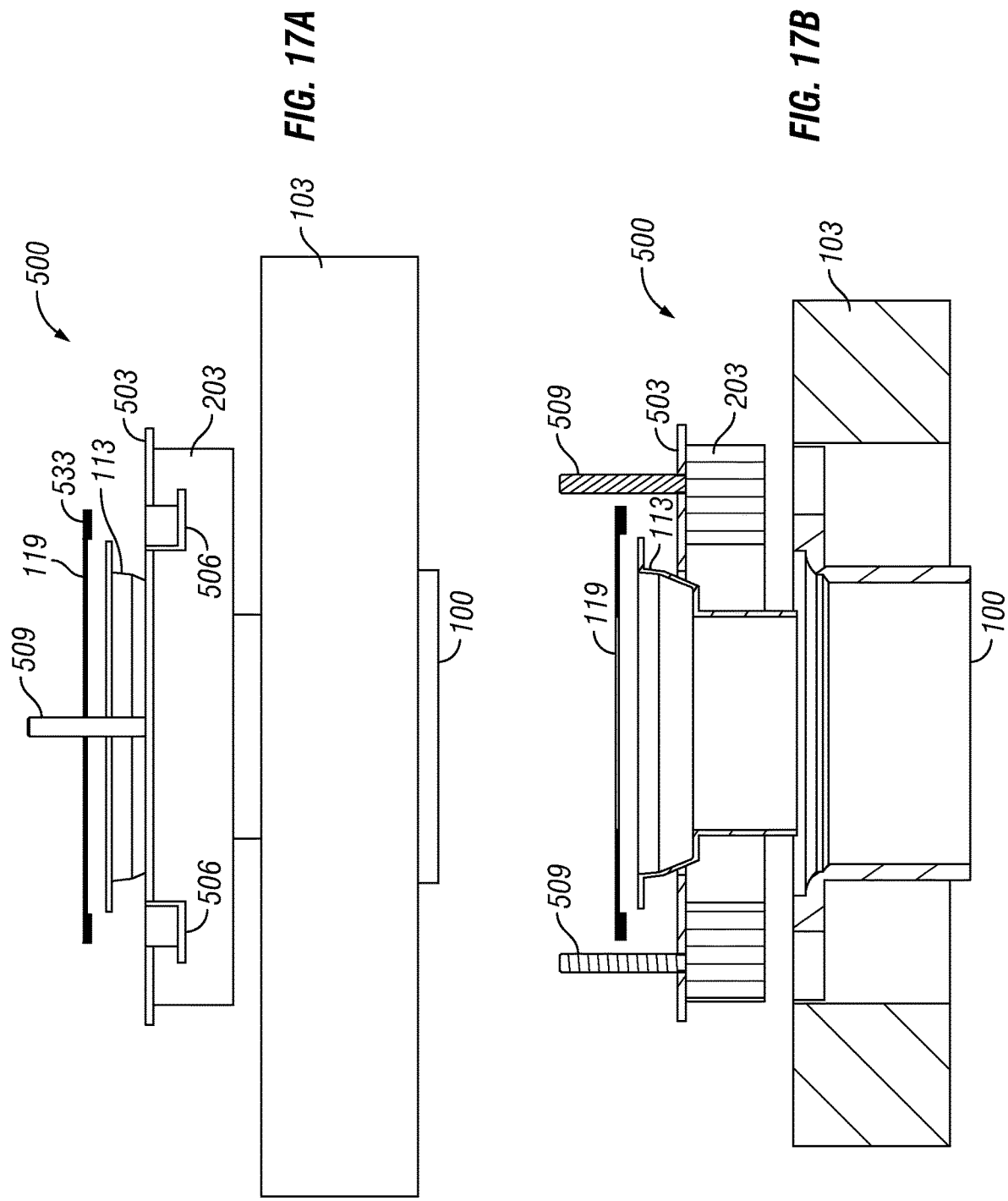
FIGS. 17A-17B are drawings of another example of a closet collar adaptation assembly according to various embodiments of the present disclosure.

With reference to FIGS. 17A and 17B, shown are additional drawings of the closet collar adaptation assembly 500 according to various embodiments of the present disclosure. In particular, FIG. 17A shows a partially-exploded side view, and FIG. 17B shows a partially-exploded cross-section view of the closet collar adaptation assembly 500 according to various embodiments. According to various embodiments, the sealing washer 119 may include thickened portions 533 along the outside diameter of the sealing washer 119 that are configured to contact the adapter plate 503. According to various embodiments, the thickened portions 533 may be adhered to the adapter plate 503. Also, the sealing washer 119 is configured to contact the closet collar adapter 113. According to various embodiments, the sealing washer 119 may be sealed or affixed to the closet collar adapter 113 to form a seal between the closet collar adapter 113 and the sealing washer 119. Thus, the sealing washer 119 may be affixed to both the closet collar adapter 113 and the adapter plate 503 to promote a seal to prevent sewage gases from escaping as can be appreciated. In another embodiment, the sealing washer 119 may comprise a constant thickness and simply may be bent down around the upper surface of the closet collar adapter 113 to be affixed to the adapter plate 503.

Figure 18:
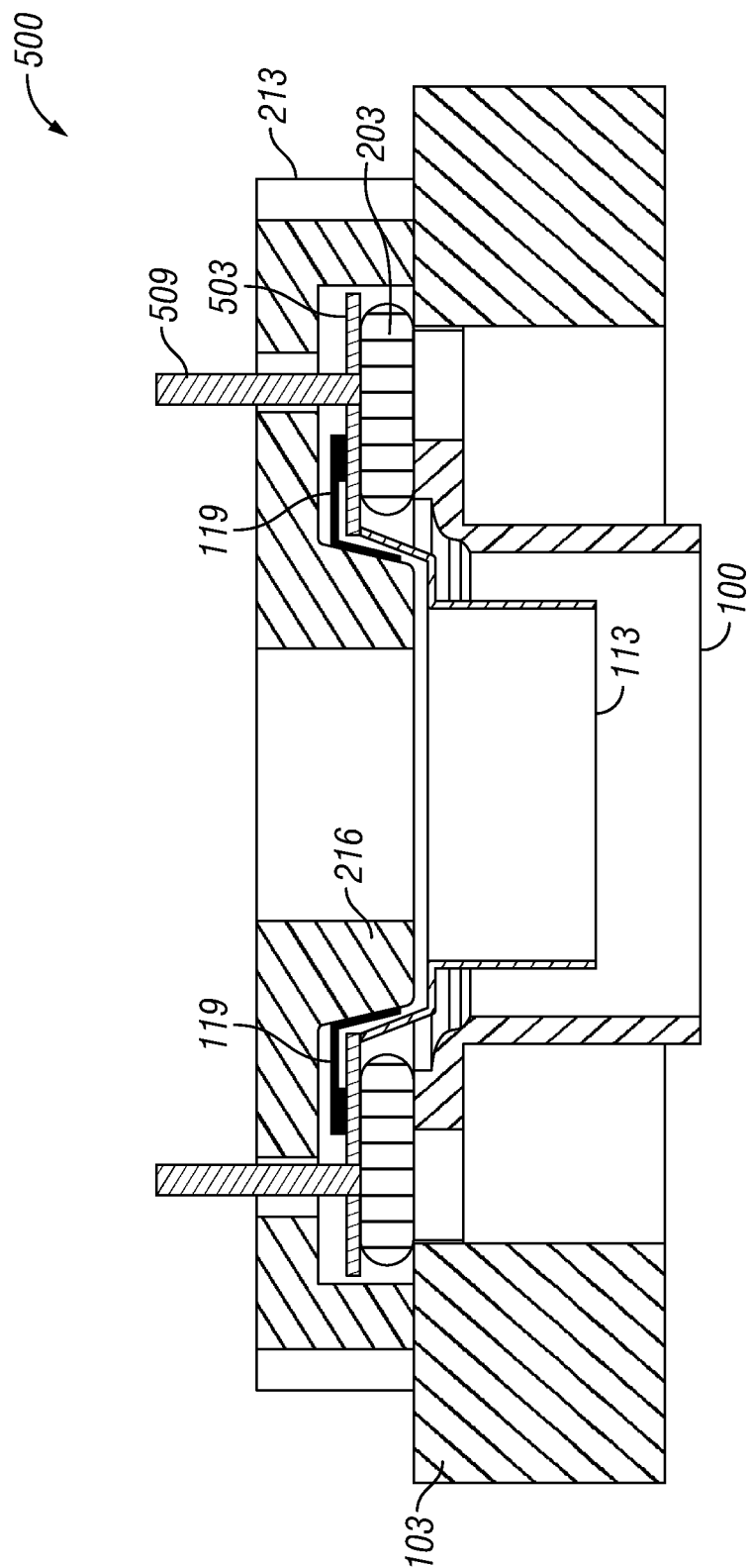
FIG. 18 is a drawing of an example of a toilet installed with a closet collar adaptation assembly according to various embodiments of the present disclosure.

With reference to FIG. 18, shown is the closet collar adaptation assembly 500 for which a toilet 213 has been installed over a closet collar 100. As shown, the sealing washer 119 makes contact with the horn 216 of the toilet 213. Additionally, the sealing washer 119 may be adhered to both the closet collar adapter 113 and the adapter plate 503 so as to prevent sewage gases from escaping through the junction of the closet collar adapter 113 and the adapter plate 503.

Figure 19:
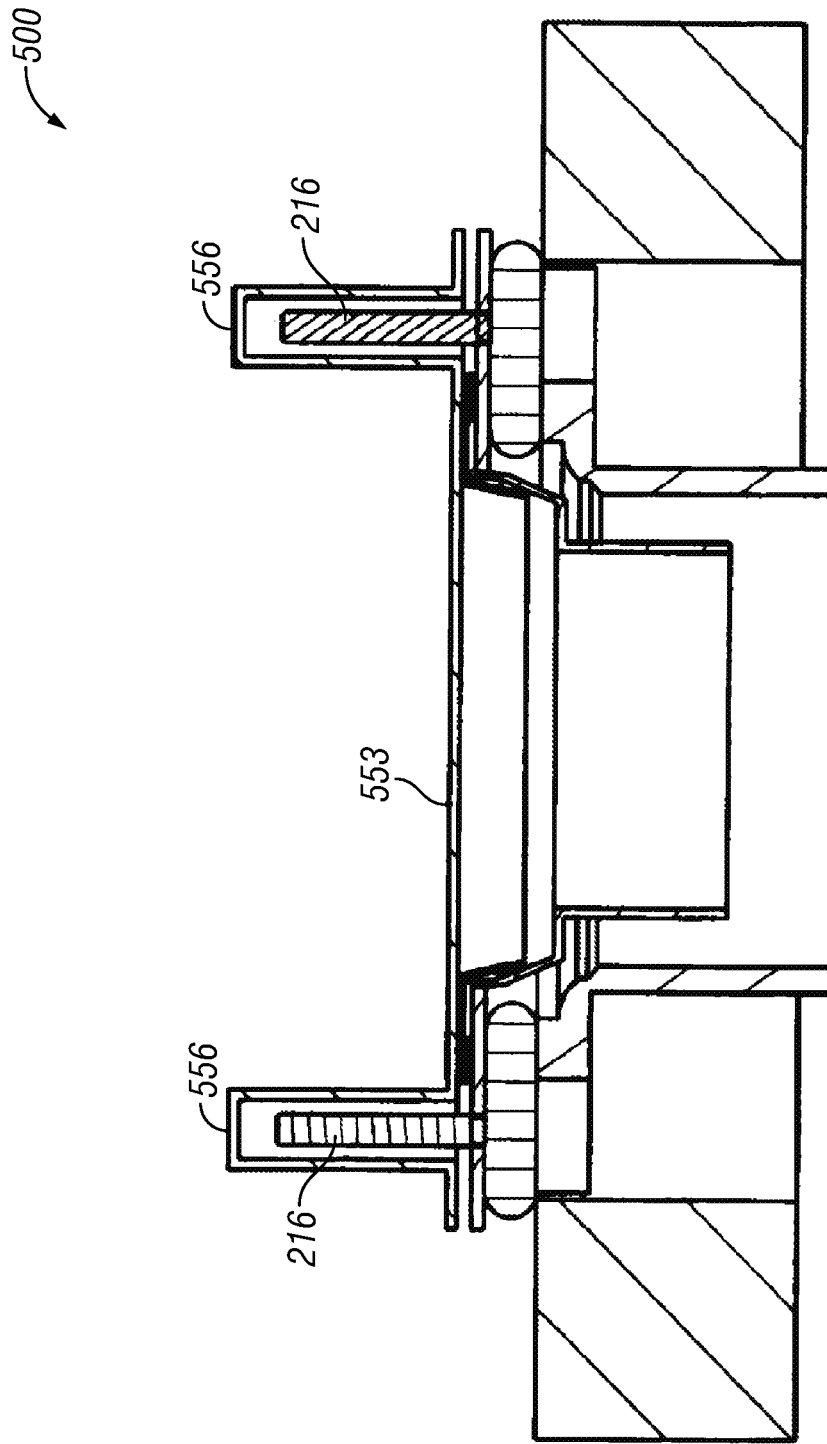
FIGS. 19-20 are drawings of a closet collar adaptation assembly with a lid according to various embodiments of the present disclosure.
Figure 20:
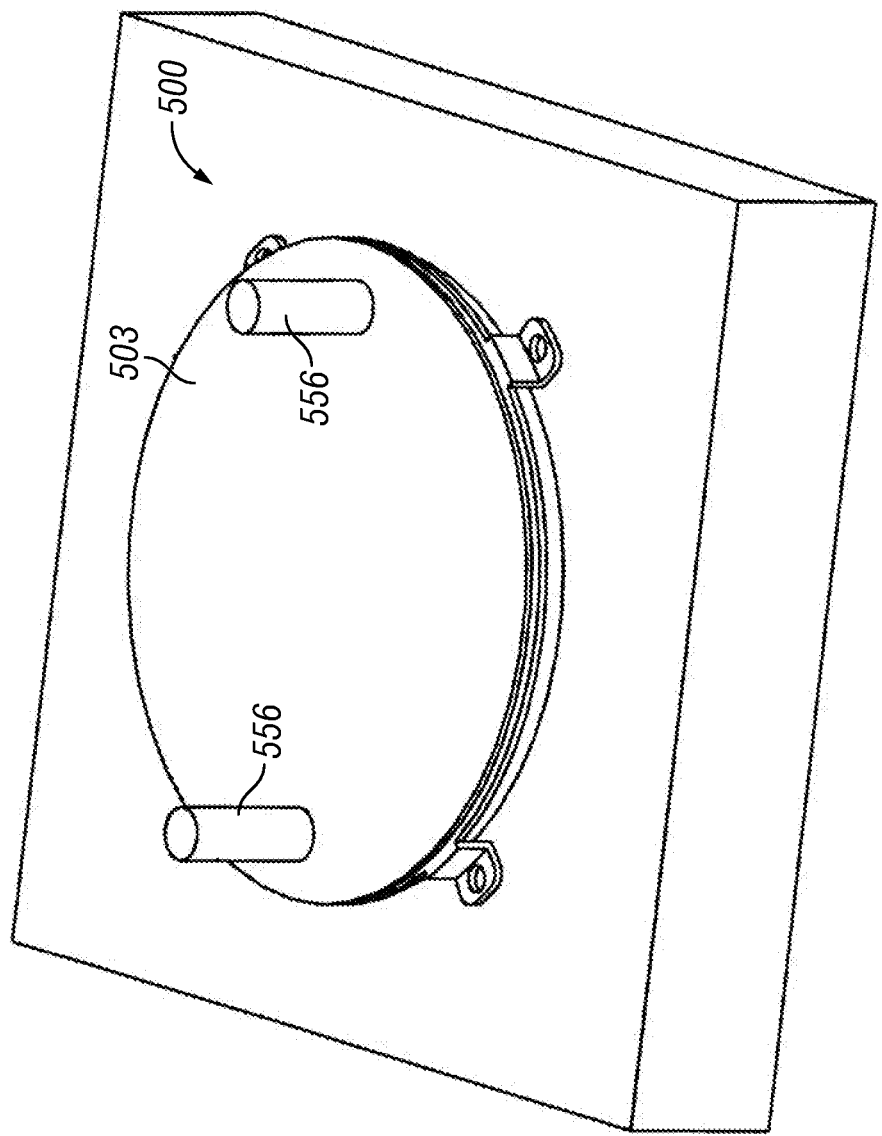

Referring to FIGS. 19 and 20, shown is the closet collar adaptation assembly 500 with a lid 553 positioned over the opening provided by the closet collar adaption assembly 500. The lid 553 may include protrusions 556 into which the anchor bolts 206 may insert to thereby facilitate the anchor bolts 206 coupling the lid 553 to the closet collar adaptation assembly 500. In some embodiments, the protrusions 556 may include internal teeth, ribs, and/or other features that may facilitate the anchor bolts 206 being restricted in the protrusions 556. The lid 553 being coupled to the closet collar adaptation assembly 500 may provide a seal over the closet collar 100.

Figure 21:
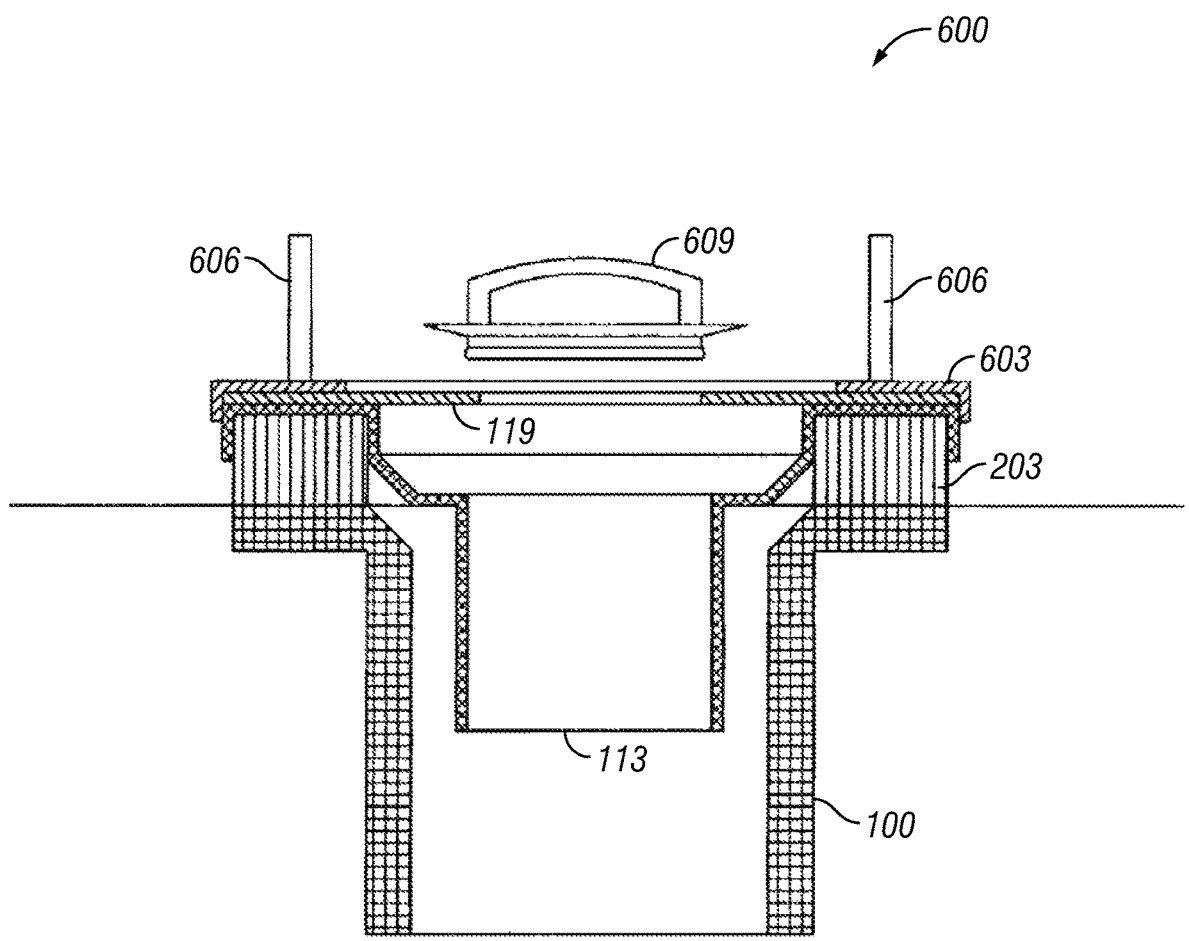
FIG. 21 is a drawing of another example of a closet collar adaptation assembly according to various embodiments of the present disclosure.

With reference to FIG. 21, shown is an example of the closet collar adaptation assembly 600 according to another embodiment of the present disclosure. As shown, the closet collar adaptation assembly 600 includes the closet collar adapter 113 that is positioned over the closet collar 100 with the flexible seal ring 203 disposed therebetween. As shown, the flexible seal ring 203 may provide a direct seal between the closet collar adapter 113 and the closet collar 100. The sealing washer 119 is disposed on the upper surface of the closet collar adapter 113. In addition, an adapter plate 603 is positioned above the sealing washer 119. The adapter plate 603 may be affixed to the sealing washer 119 by, for example, an appropriate adhesive, fasteners, or any other suitable mechanism. Alternatively, the adapter plate 603 may simply be placed over the assembly as shown. The adapter plate 603 may include holes 513 (FIG. 15) and legs 506 (FIG. 15) that are not shown in the embodiment of FIG. 21. Bolts 606 extend from the upper surface of the adapter plate 603 in the present embodiment.

According to various embodiments, the closet collar adaptation assembly 600 may be advantageous in that there are fewer joints to seal to prevent sewage gases and other matter from escaping the joint between the toilet 213 (FIG. 3) and the closet collar 100. Specifically, the flexible seal ring 203 provides for sealing between the closet collar adapter 113 and the closet collar 100. Also, the sealing washer 119 is directly positioned on the upper surface of the closet collar adapter 113. This may provide greater surface area for a greater seal. Further, the adapter plate 603 may provide greater stability for all of the seals and may hold the entire closet collar adaptation assembly 600 in place over the closet collar 100 as can be appreciated.

In addition, a plug 609 may be provided that may be pushed into the hole presented by the sealing washer 119 to plug the hole over the closet collar 100. The plug 609 may prevent the escape of sewage gases when a toilet has not been installed. To this end, the plug 609 may be employed with any one of the embodiments of the various closet collar adaptation assemblies described herein.

Although the embodiment of FIG. 21 shows the components of the closet collar adaptation assembly 600 as being separate components, in alternative embodiments, one or more of the components of the adaptation assembly 600 may be integrally molded as a single component. In further alternative embodiments, one or more of the components of the closet collar adaptation assembly 600 may be bonded to form a single component using, for example, an overmolding process or any other suitable method. For example, the sealing washer 119, the closet collar adapter 113, and/or other components may be overmolded to the adapter plate 603 in various embodiments.

Figure 22A:
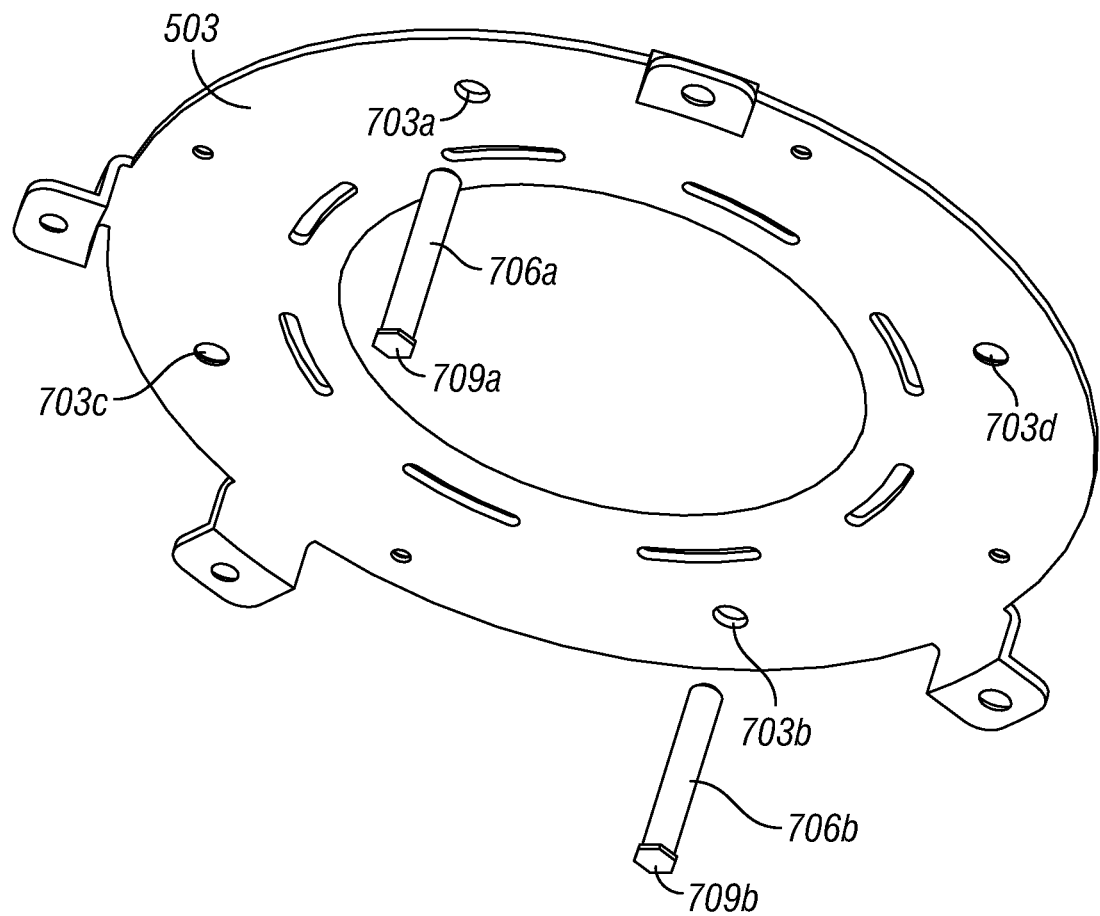
FIGS. 22A-22B are drawings of an example of an adapter plate for a closet collar adaptation assembly according to various embodiments of the present disclosure.
Figure 22B:
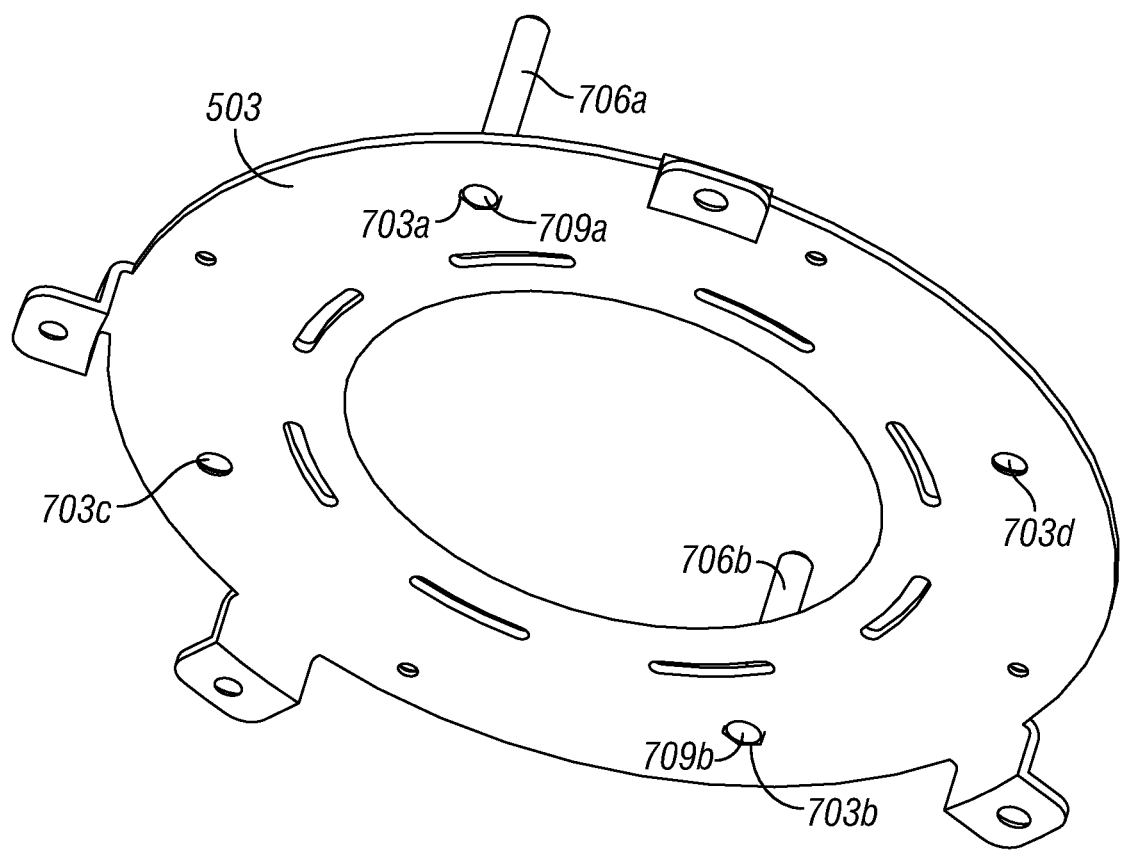

With reference to FIGS. 22A-22B, shown is the adapter plate 503 according to various embodiments. In the embodiment shown, the bolts 706a-706b are separate components from the adapter plate 503. The adapter plate 503 in FIGS. 22A-22B includes one or more holes 703a-703d to receive the bolts 706a-706b. The bolts 706a-706b may be passed into the corresponding holes 703a-703d so that the bolt heads 709a-709b may be flush with the adapter plate 503. A press fit, threads, or any other suitable type of mechanism may retain the bolts 706a-706b in the holes 703a-703d.

Figure 23C:
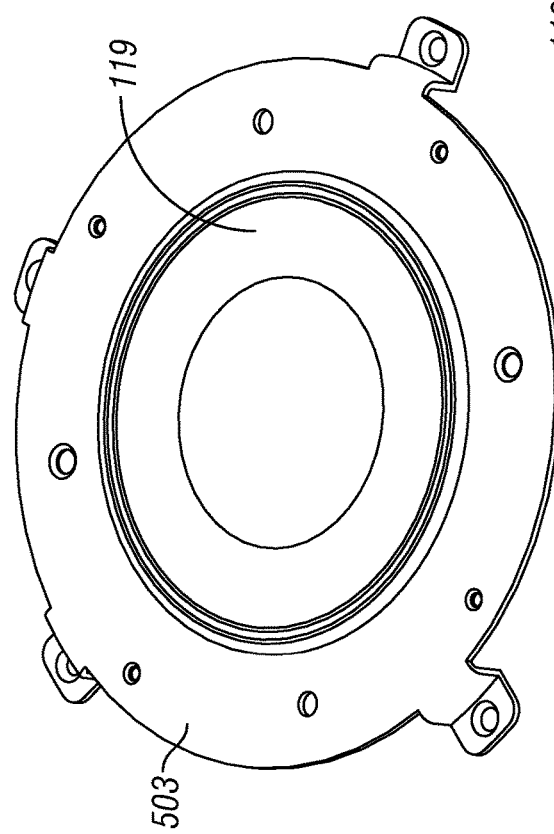
Figure 23E:
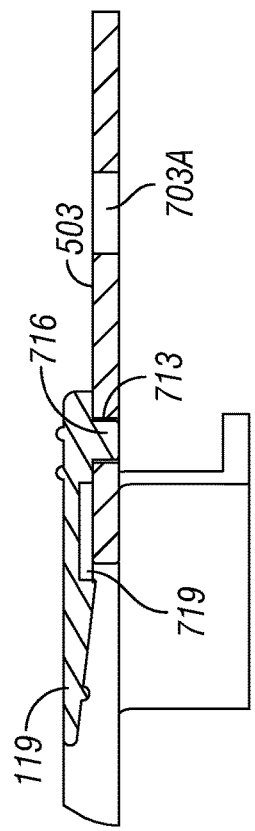
Figure 23D:
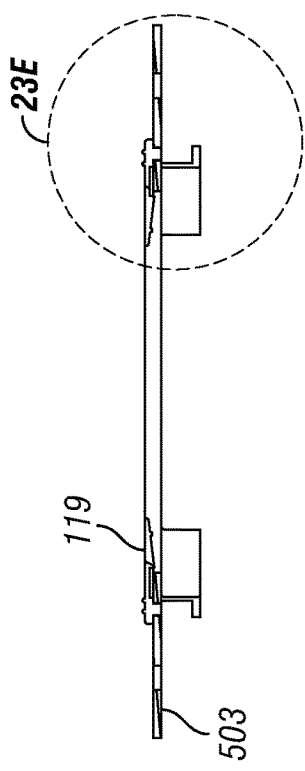

Turning now to FIGS. 23A-23E, shown is an interaction of the adapter plate 503 and the sealing washer 119 according to various embodiments. In the embodiment shown, the adapter plate 503 now includes one or more receptacles 713, and the sealing washer 119 includes corresponding protrusions 716. When the sealing washer 119 is seated on the adapter plate 503 during assembly, for example, the protrusions 716 of the sealing washer 119 may insert into the receptacles 713 of the adapter plate 503. Having the protrusions 716 fit in the receptacles 713 may facilitate a proper concentric alignment of the sealing washer 119 with respect to the adapter plate 503. As best shown in FIG. 23E, the sealing washer 119 may also include a lip 719 that provides a space to accommodate the closet collar adapter 113, as will be shown later.

Figure 24A:
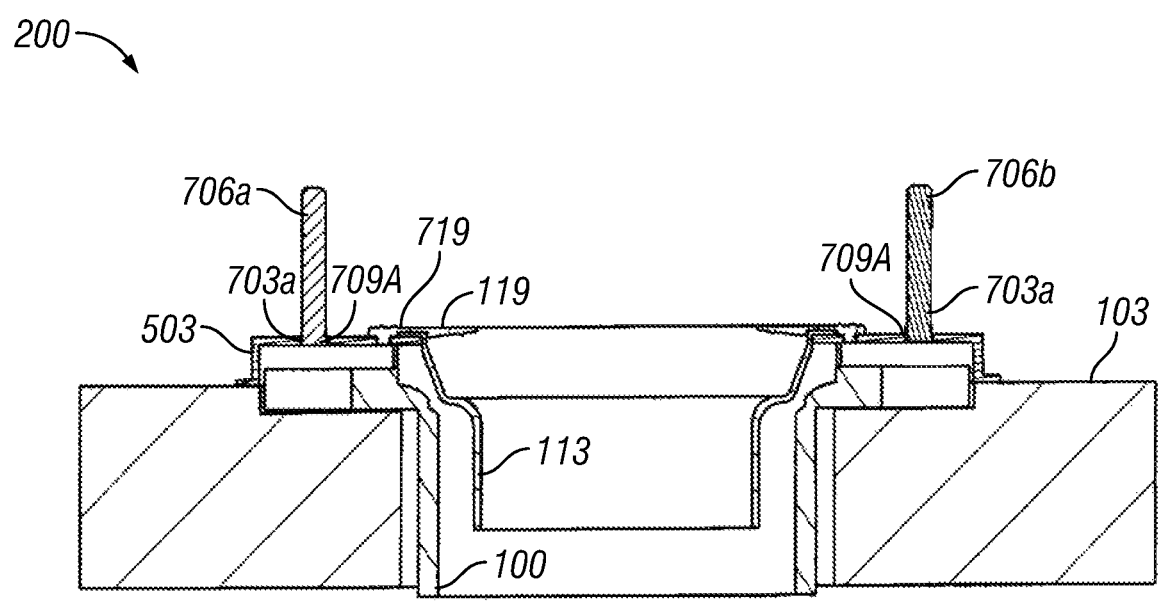
FIGS. 24A-24B are drawings showing another example of a closet collar adaptation assembly according to various embodiments of the present disclosure.

With reference to FIG. 24A, shown is the closet collar adaptation assembly 200 according to various embodiments. The closet collar adaptation assembly 200 may include the adapter plate 503, the closet collar adapter 113, the sealing washer 119, and potentially other components. The adapter plate 503 may be mounted to the surface of the flooring 103, and the closet collar adapter 113 may be seated on the adapter plate 503 as shown. Additionally, the sealing washer 119 may be seated on the closet collar adapter 113 and the adapter plate 503. A portion of the closet collar adapter 113 may also fit between the adapter plate 503 and the lip 719 of the sealing washer 119. By the protrusions 716 of the sealing washer 119 being inserted into the receptacles 713 of the adapter plate 503, proper concentric alignments of the adapter plate 503, the sealing washer 119, and the closet collar adapter 113 may be obtained. As shown in FIG. 24A, the bolts 706a-706b may pass through and be retained in the corresponding holes 703a-703b of the adapter plate 503 so that the bolt heads 709a-709b are flush with the adapter plate 503.

Figure 24B:
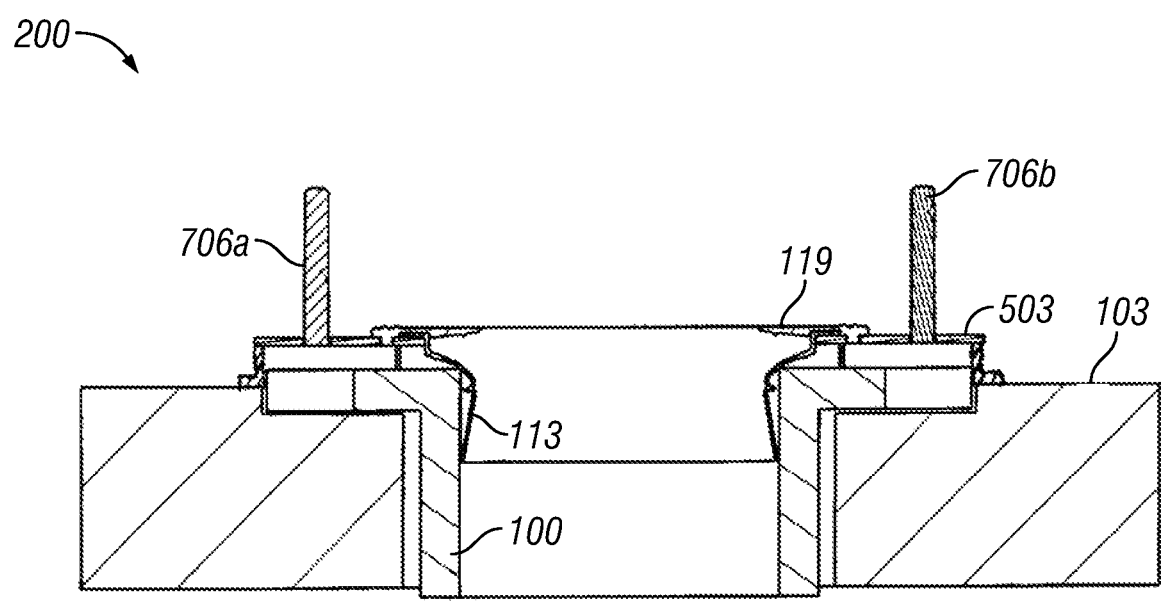

Turning to FIG. 24B, shown is the closet collar adaptation assembly 200 according to various embodiments. As shown in FIG. 24B, the closet collar adapter 113 may be flexible to accommodate various flooring 103, closet collar 100, and/or drain pipe geometries. To this end, the closet collar adapter 113 may comprise a neoprene, foam rubber, polyvinylchloride (PVC) rubber, thermoplastic elastomer (TPE), thermoplastic rubber (TPR), styrene-butadiene rubber (SBR), ethylene propylene diene monomer (EPDM) rubber, flexible PVC, or another type of suitable material. One or more of the components of the closet collar adaptation assembly 200, such as the closet collar adapter 113 and/or the sealing washer 119 may comprise an antimicrobial material, such as an integrated antimicrobial agent and/or an antimicrobial coating.

Further, one or more of the components of the closet collar adaptation assembly 200, such as the closet collar adapter 113 and/or the sealing washer 119, may be constructed using an overmolding process. The use of thermoplastic rubber flexible PVC, or thermoplastic elastomer may facilitate construction of the closet collar adapter 113 using injection molding processes. Additionally, one or more of the components of the closet collar adaptation assembly 200, such as the closet collar adapter 113 and/or the sealing washer 119 may be integrally molded as a single part according to various embodiments.

Figure 25A:
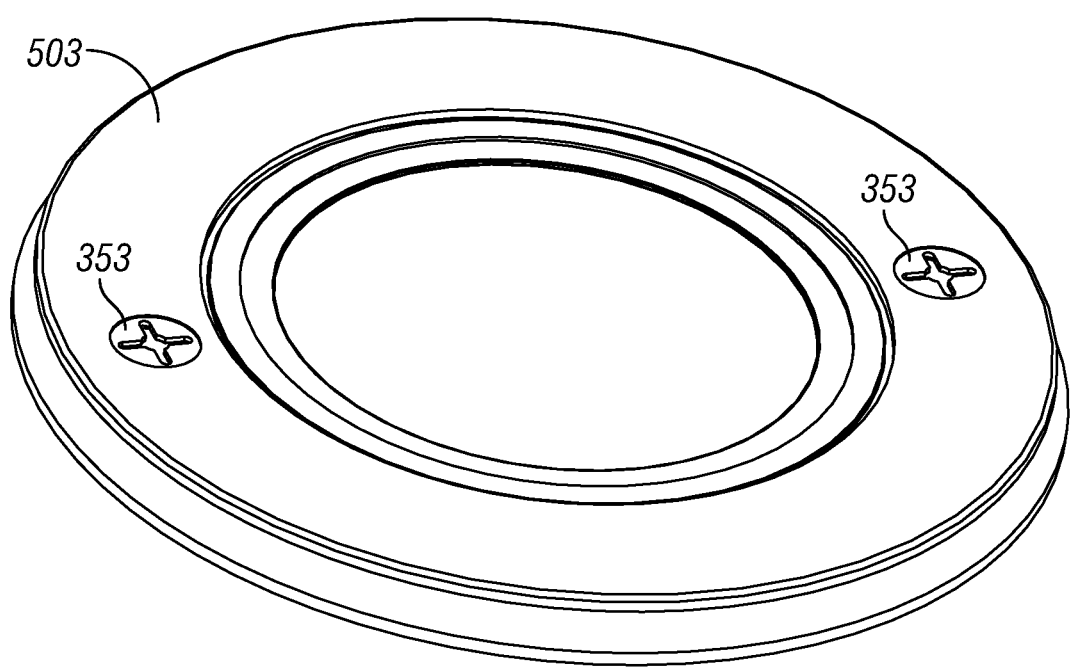
FIGS. 25A-25C are drawings showing examples of an adapter plate for a closet collar adaptation assembly according to various embodiments of the present disclosure.

Turning to FIG. 25A, shown is an alternative embodiment of the adapter plate 503 according to various embodiments. As shown, the clips 353 may be formed as part of the adapter plate 503. The clips 353 may also accept and retain the anchor bolts 206. The clips 353 in the present embodiment comprise mouths that may grip anchor bolts 206.

Figure 25B:
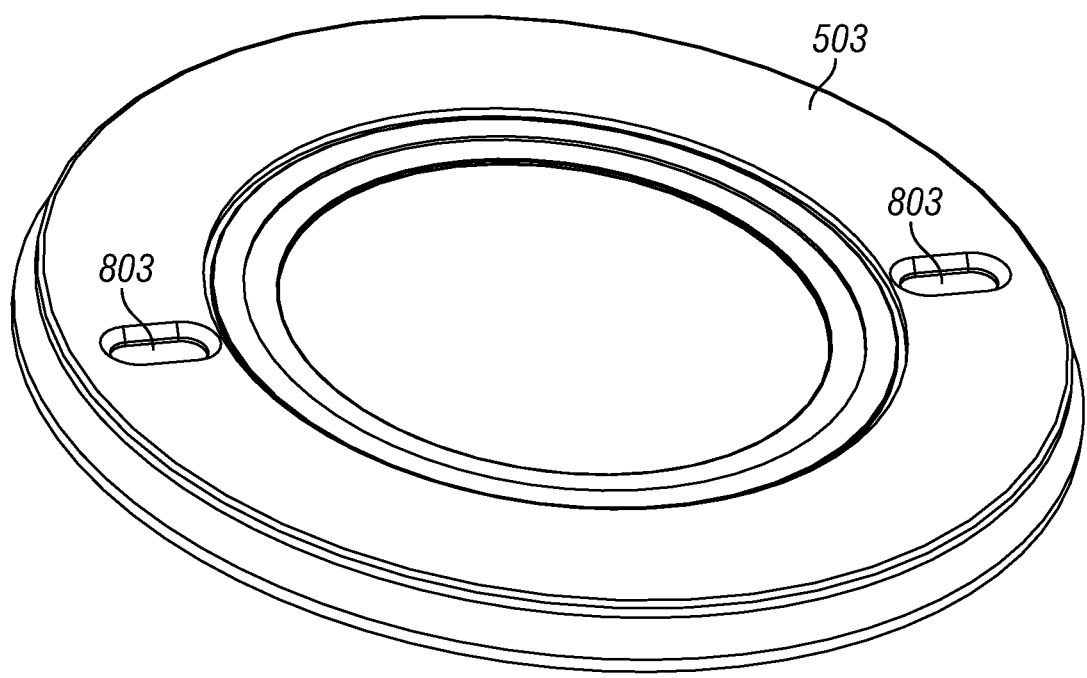

Referring now to FIG. 25B, shown is another embodiment of the adapter plate 503. In this embodiment, the adapter plate 503 includes elongated slots 803 that receive the anchor bolts 206 (FIG. 3). Because the slots 803 are elongated, the closet collar adapter 113 may accept anchor bolts 206 that are at various radial distances with respect to the center of the adapter plate 503.

Figure 25C:
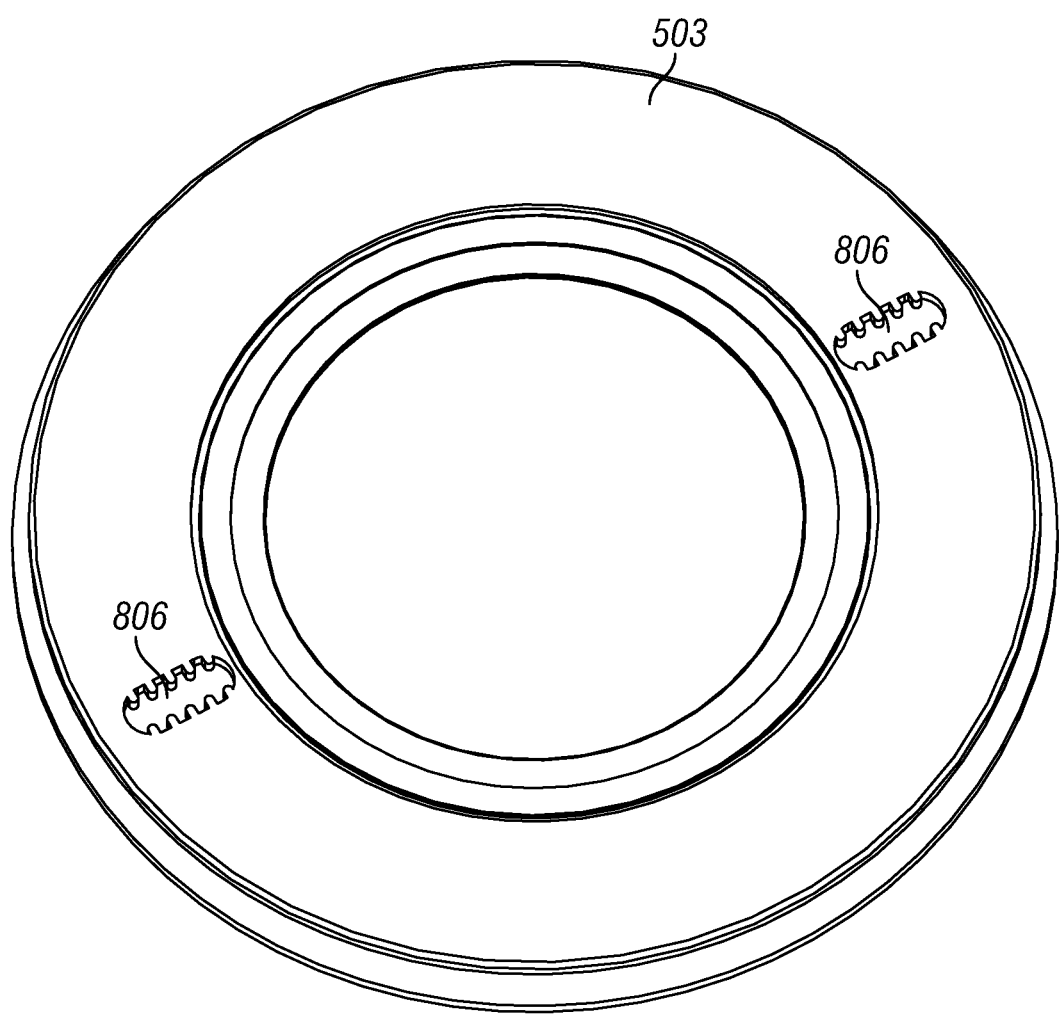

Turning to FIG. 25C, shown is another embodiment of the adapter plate 503 In the embodiment shown, elongated clips 806 are now formed as part of the adapter plate 503. The elongated clips 806 in the present example comprise teeth that may grip anchor bolts 206 (FIG. 3). The elongated clips 806 may accept and retain the anchor bolts 206 that are at various radial distances with respect to the center of the adapter plate 503.

Figure 26A:
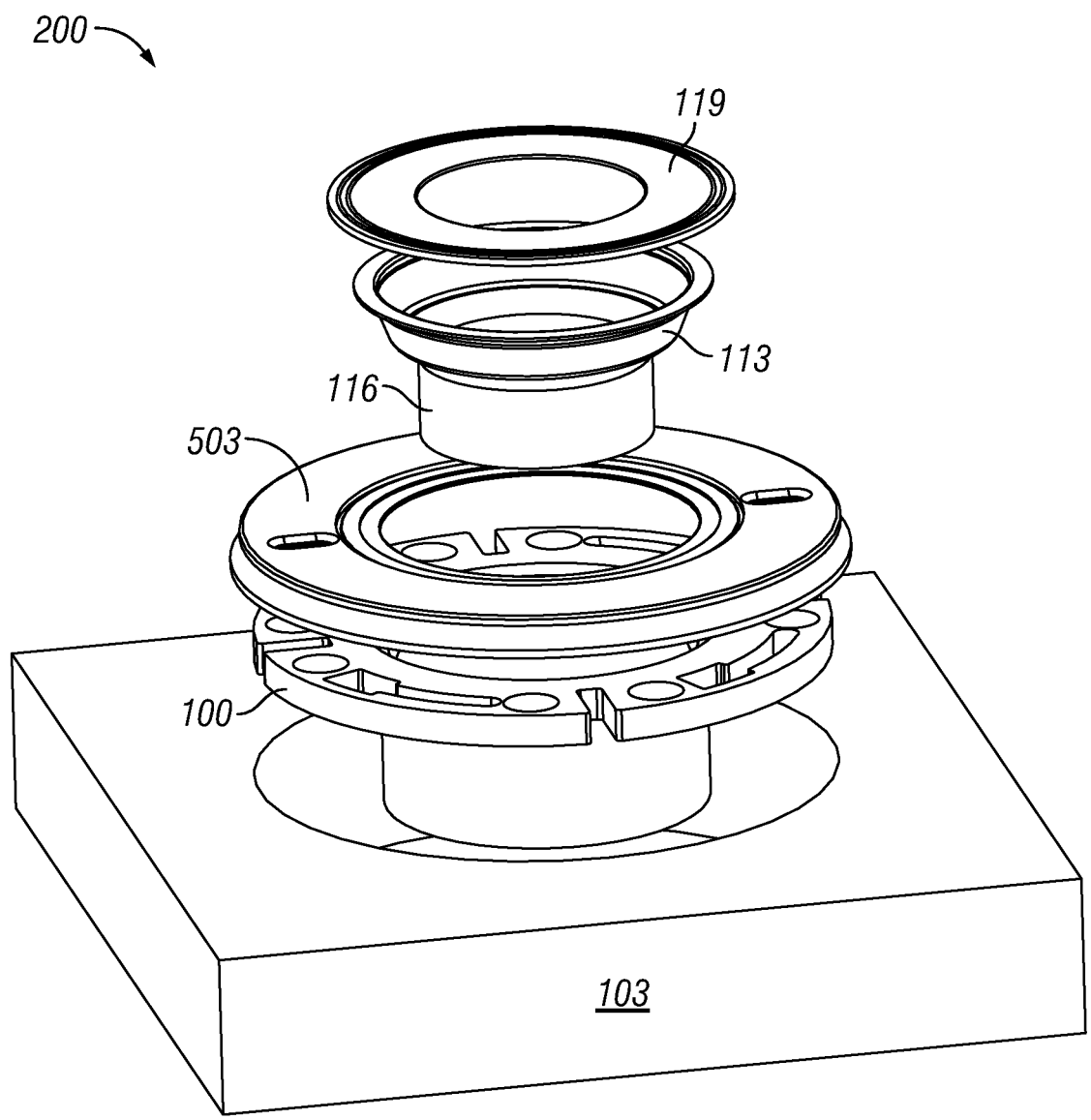
FIGS. 26A-26C are drawings showing examples of a closet collar adaptation assembly according to various embodiments of the present disclosure.
Figure 26B:
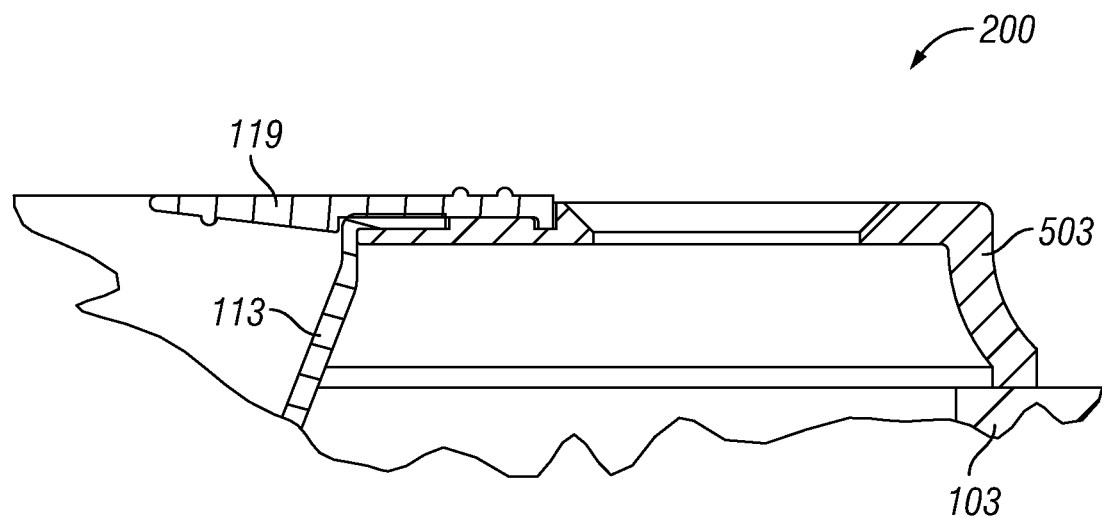
Figure 26C:
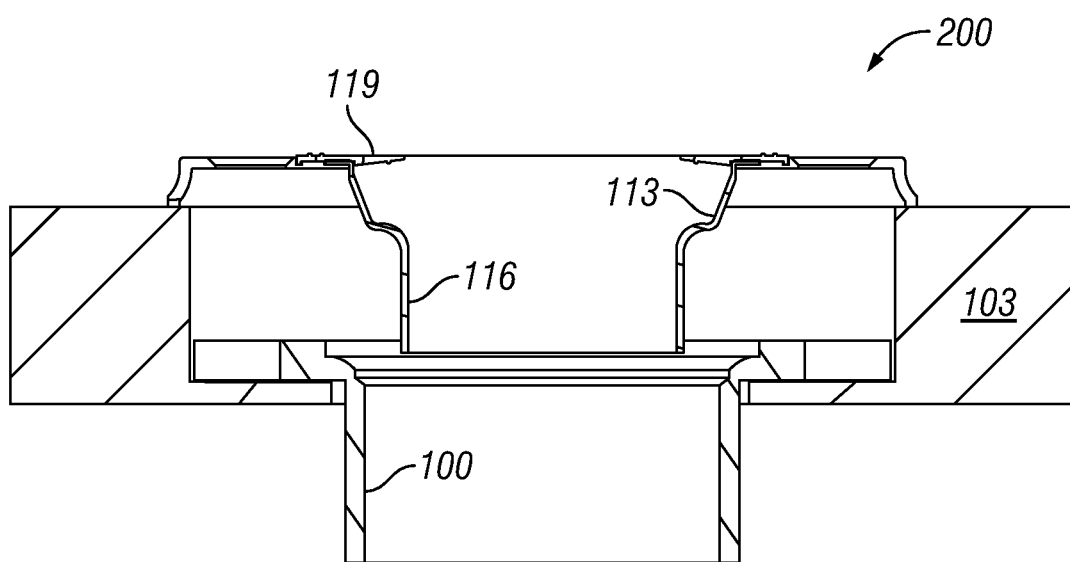

With reference to FIGS. 26A-26C, shown is the closet collar adaptation assembly 200 according to various embodiments. As shown, the adapter plate 503 may be seated on the flooring 103. Also, the closet collar adapter 113 may be seated between the sealing washer 119 and the adapter plate 503. The sealing washer 119 and/or the closet collar adapter 113 may be glued to the adapter plate 503, for example, during assembly of the closet collar adaptation assembly 200. Further, the sealing washer 119 and the closet collar adapter 113 may be glued together. In some embodiments, gluing the closet collar adapter 113 may be omitted, because the closet collar adapter 113 may be seated and retained between the sealing washer 119 and the adapter plate 503.

As best shown in FIG. 26C, the bottom opening of the pipe extension 116 for the closet collar adapter 113 is at a level that is lower than the top opening of the closet collar 100. Thus, wastes passing through the pipe extension 116 may pass from the closet collar adapter 113 through the closet collar 100.

Figure 27A:
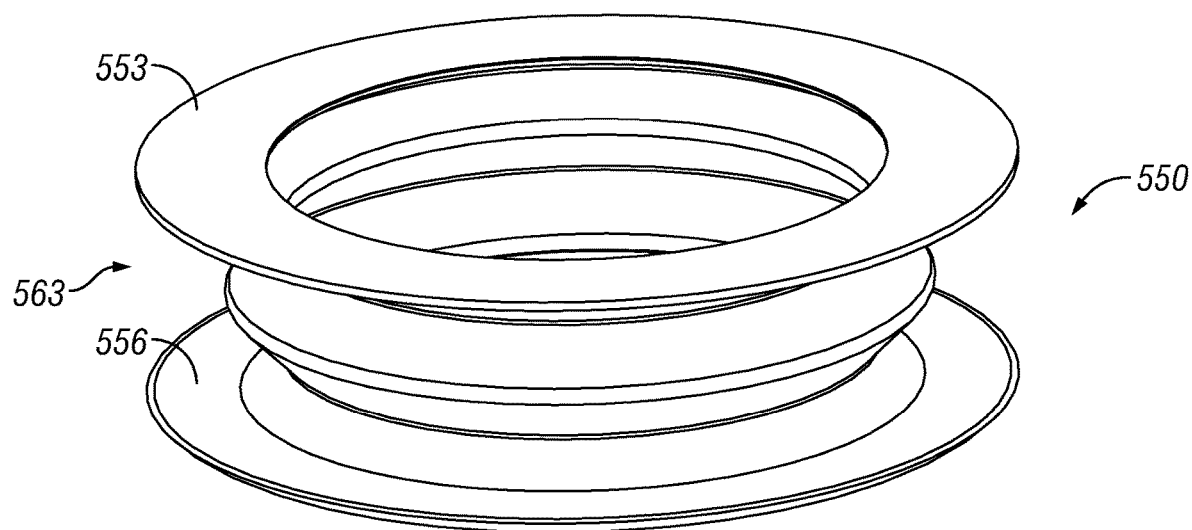
FIGS. 27A-27B are drawings showing an example of a bellow for a closet collar adaptation assembly according to various embodiments of the present disclosure.
Figure 27B:
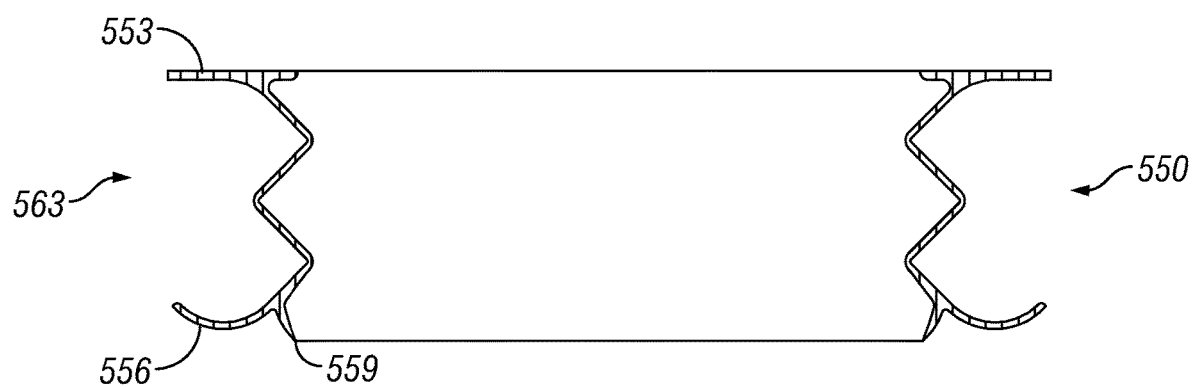

Turning now to FIGS. 27A-27B, shown is a bellow 550 according to various embodiments. The bellow 550 may include a first lip 553, a second lip 556, a ridge 559, and a collapsible portion 563. The bellow 550 may comprise a flexible material, such as flexible PVC, thermoplastic rubber, a thermoplastic elastomer, or any other type of material. In various embodiments, the bellow 550, sealing washer 119, closet collar adapter 113, and/or other components may be constructed using overmolding techniques. For example, these components may be overmolded to the adapter plate 503 using through-holes in the adapter plate 503 to facilitate a bond between the components.

Figure 27C:
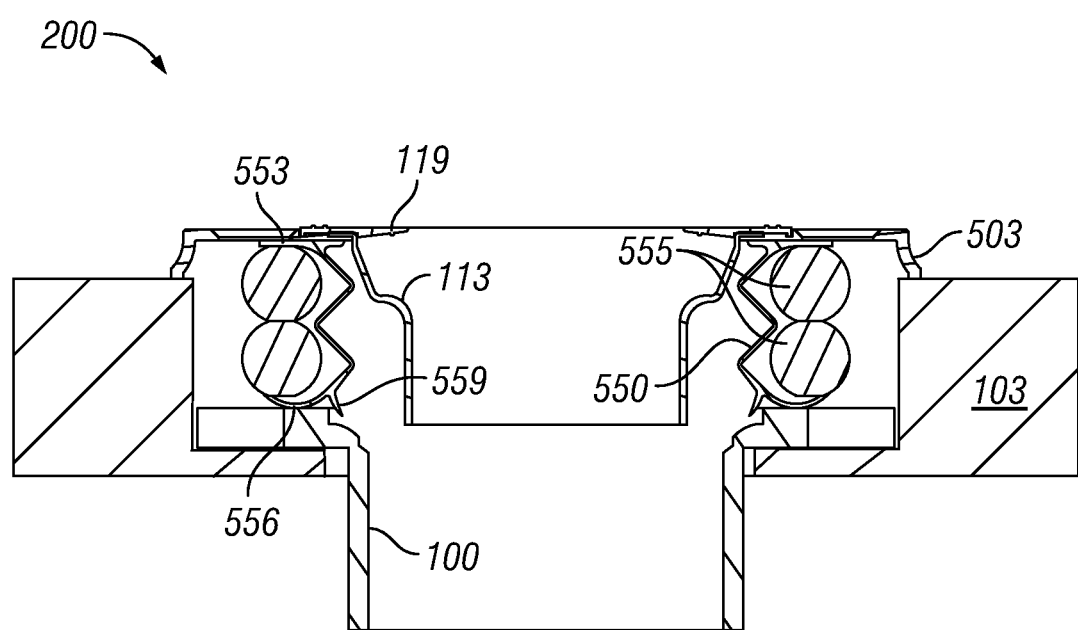
FIG. 27C is a drawing showing another example of a closet collar adaptation assembly according to various embodiments of the present disclosure.

With reference now to FIG. 27C, shown is the closet collar adaptation assembly 200 according to various embodiments. The closet collar adaptation assembly 200 includes the adapter plate 503 seated on the flooring 103. The sealing washer 119 may be seated on the adapter plate 503, and the closet collar adapter 113 may be seated between the adapter plate 503 and the sealing washer 119. Additionally, the bellow 550 may be disposed between the top of the closet collar 100 and the bottom of the adapter plate 503. In this sense, the first lip 553 of the bellow 550 may be in contact with the adapter plate 503, and the second lip 556 and the ridge 559 may be in contact with the closet collar 100. In some embodiments, an adhesive may be disposed on the first lip 553 and/or the second lip 556 to facilitate installation and/or a seal. Also, in various embodiments, the first lip 553 of the bellow may be overmolded to the adapter plate 503. Thus, the bellow 550 may act as a seal and thereby prevent liquids and/or gases from escaping from the closet collar adaptation assembly 200.

One or more of the flexible rings 555 may be located between the bellow 550 and the flooring 103. The flexible rings 555 may comprise rubber, foam, or any other type of material. Additionally, the flexible rings 555 may be compressible and thereby facilitate the closet collar adaptation assembly 200 being compatible with closet collars 100 that are at various heights with respect to the flooring 103.

Figure 28A:
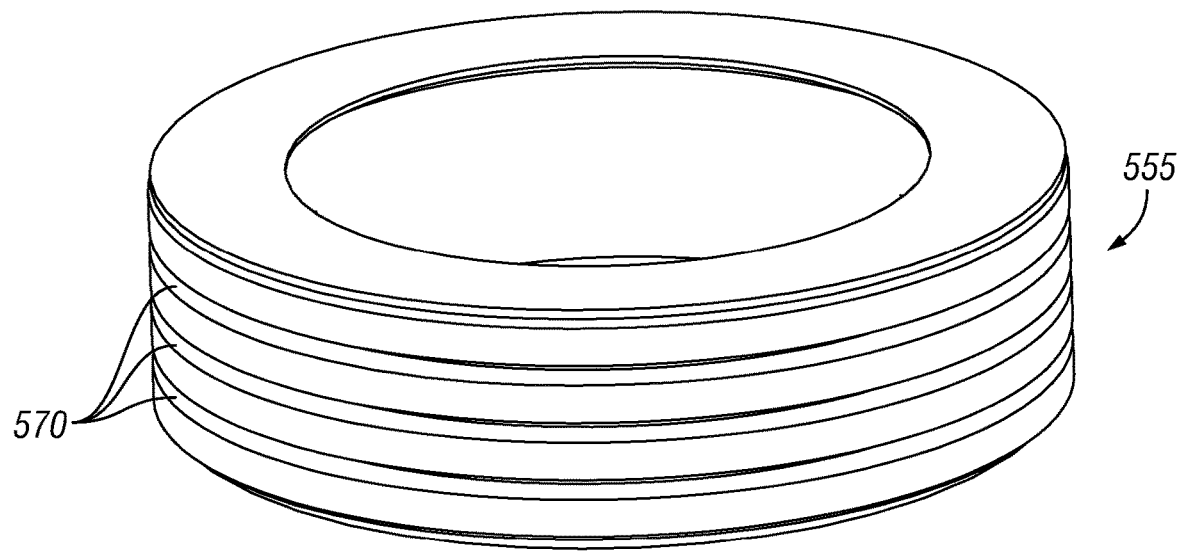
FIGS. 28A-28B, 29A-29B, and 30A-30D are drawings showing examples of flexible rings for a closet collar adaptation assembly according to various embodiments of the present disclosure.

Turning now to FIG. 28A, shown is an alternative embodiment of the flexible ring 555 according to various embodiments. The flexible ring 555 may include one or more grooves 570, for example, along an exterior circumference of the flexible ring 555. The flexible ring 555 may be manufactured using an extrusion process or other type of process, and ends of the extruded material may be glued together in order to form the ring shape.

Figure 28B:
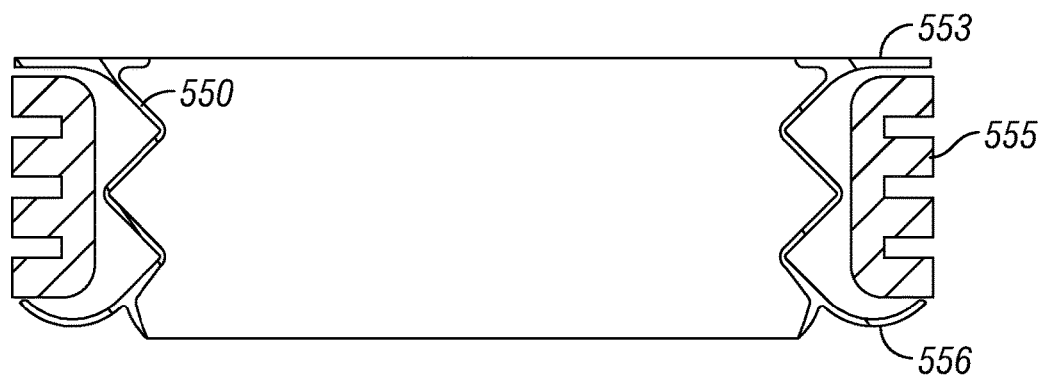

FIG. 28B shows an interaction of the flexible ring 555 of FIG. 28A with the bellow 550 according to various embodiments. The flexible ring 555 may be disposed between the first lip 553 and the second lip 556 of the bellow 550.

Figure 29A:

With reference to FIG. 29A, shown is an interaction of the bellow 550 with the flexible ring 555 according to various embodiments. In the embodiment shown, the flexible ring 555 has a circular cross-section. As shown, the collapsible portion 563 of the bellow 550 may at least partially collapse. Upon the collapsible portion 563 at least partially collapsing due to a force exerted, for example by the adapter plate 503, the first lip 553 and second lip 556 may be in contact with the flexible ring 555.

Figure 29B:
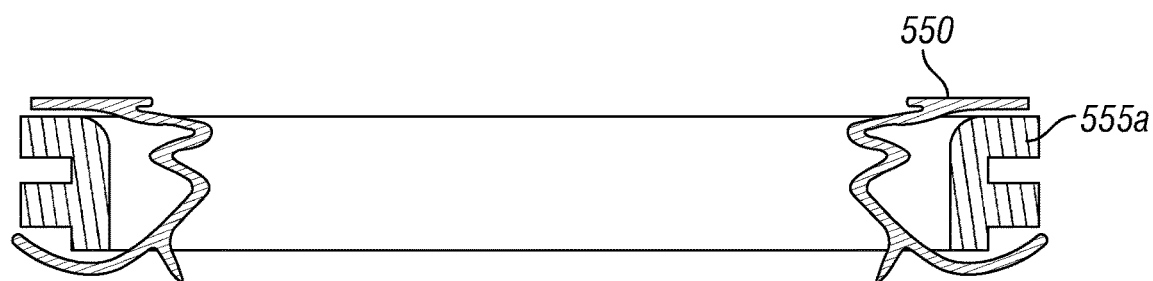

Turning now to FIG. 29B, shown is an interaction of the bellow 550 with the flexible ring 555 according to further embodiments. In this embodiment, the flexible ring 555, referred to herein as the flexible ring 555a, may be a portion that has been cut and removed from the flexible ring 555 shown in FIG. 28A.

Figure 30A:
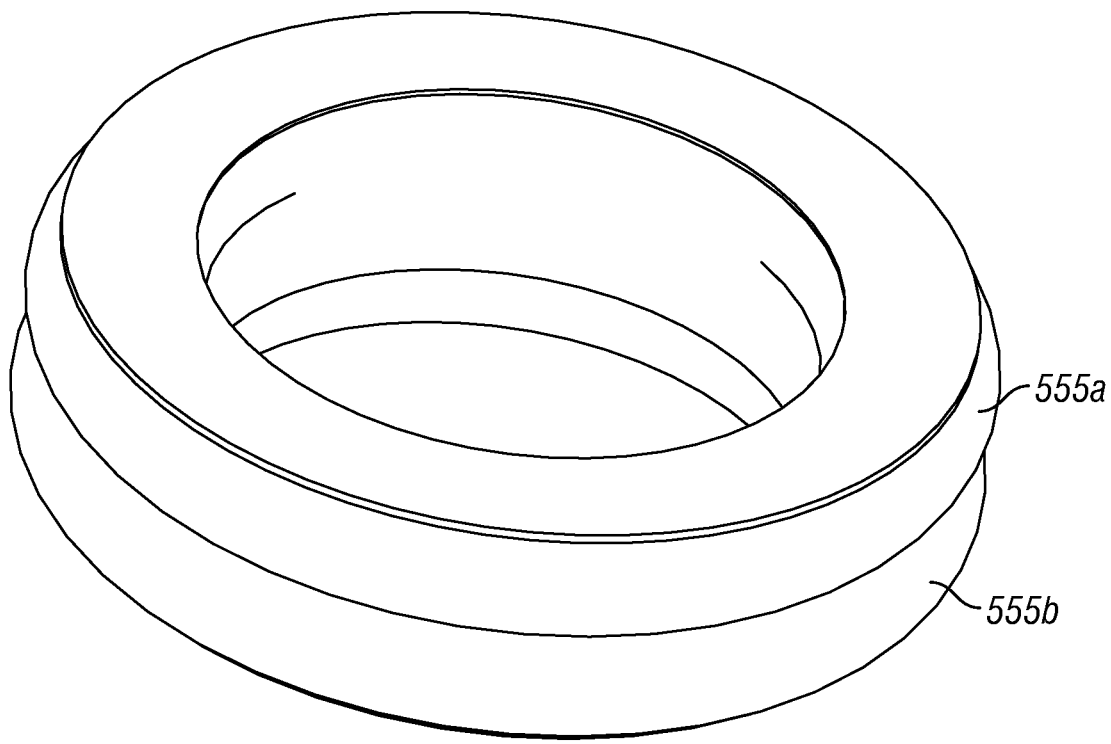

With reference to FIG. 30A shown is an alternative embodiment of the flexible ring 555a. FIG. 30A shows multiple flexible rings 555, referred to herein as the flexible ring 555a and the flexible ring 555b. The flexible rings 555a-555b may be hollow according to various embodiments.

Figure 30B:

FIG. 30B shows an interaction of the flexible rings 555a-555b of FIG. 30A with the bellow 550 according to various embodiments. One or more flexible rings 555a-555b may be stacked to facilitate a proper seal between the closet collar adapter 113 (FIG. 24A) and the closet collar 100 (FIG. 24A) when the closet collar 100 is recessed in the flooring 103 (FIG. 24A).

Figure 30C:
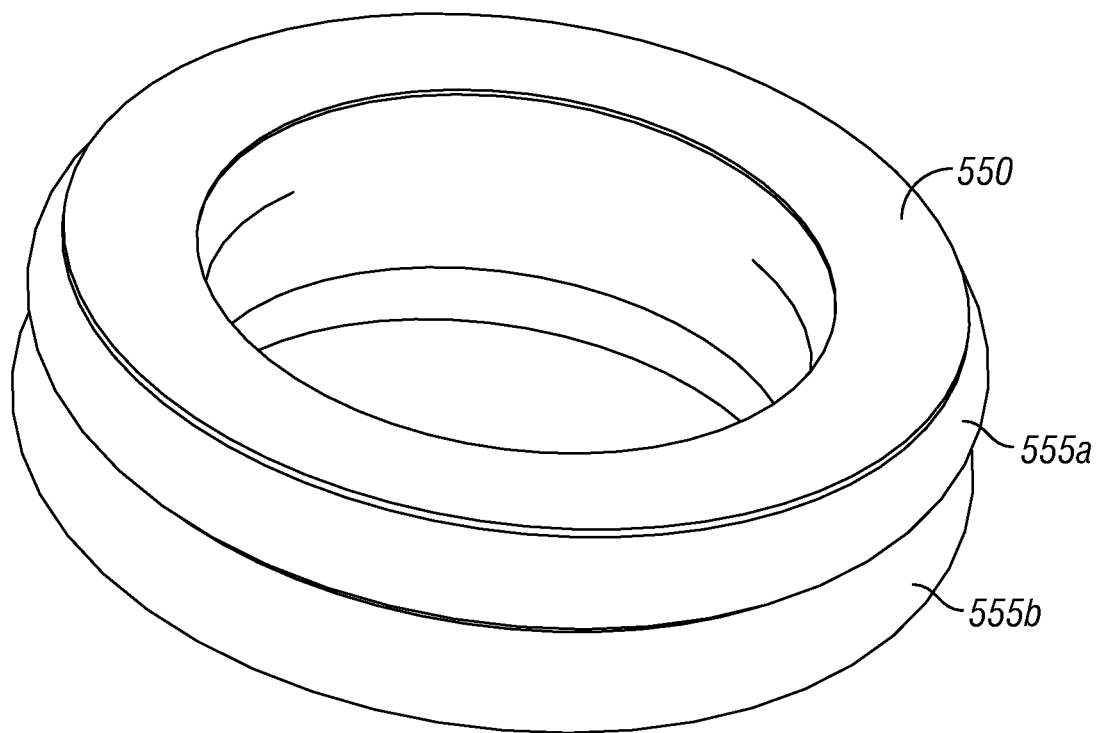
Figure 30D:

With reference to FIGS. 30C-30D, shown is an alternative embodiment of the first flexible ring 555a and the second flexible ring 555b and their interactions with the bellow 550 according to various embodiments. As shown, the first flexible ring 555a and the second flexible ring 555b may be connected at a joint 575 and thus formed as a single component. A user, for example, may cut along the joint 575 to separate the first flexible ring 555a from the second flexible ring 555b.

Figure 31A:
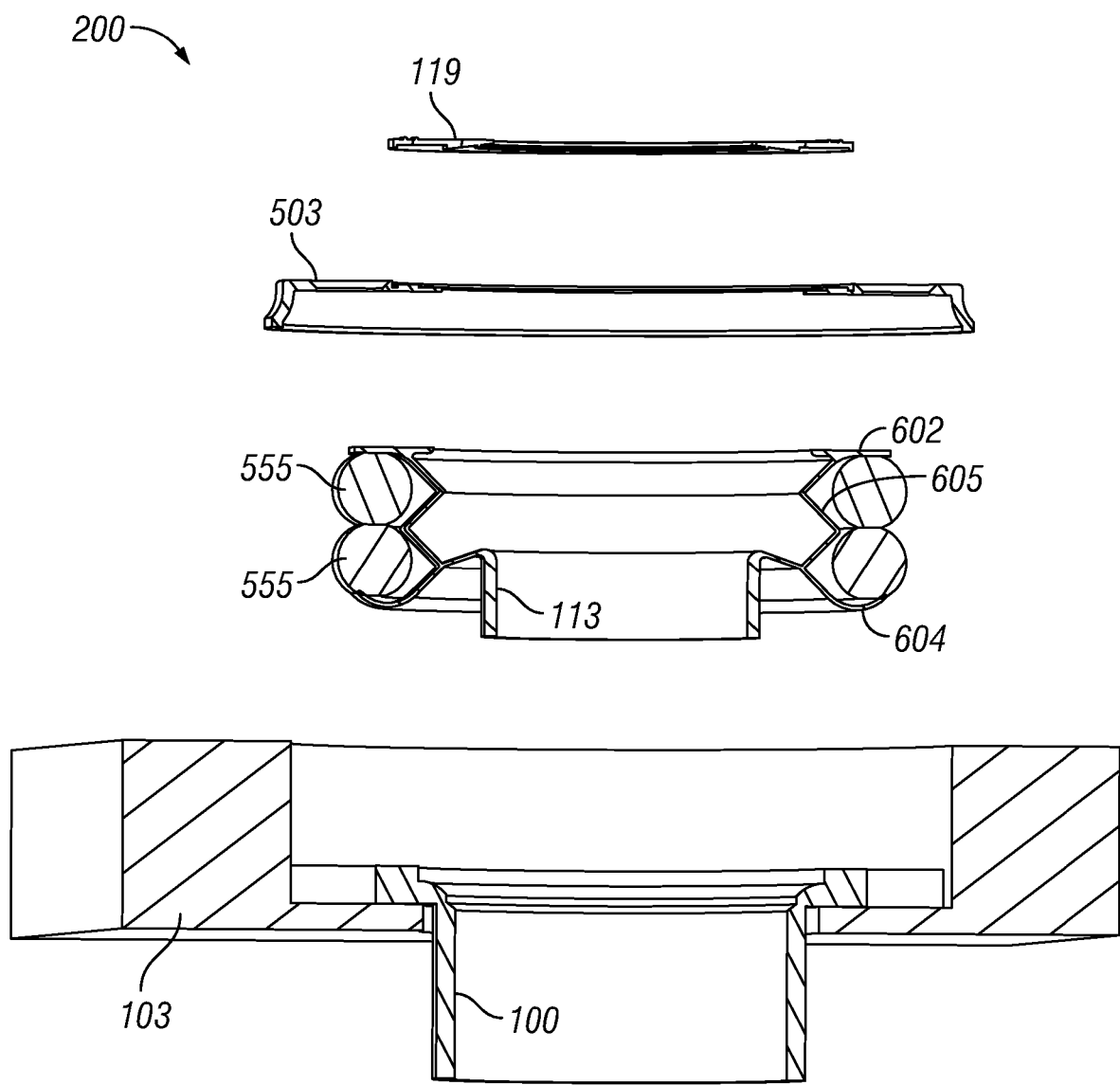
FIGS. 31A-31B and 32A-32C are drawings showing another example of a closet collar adaptation assembly according to various embodiments of the present disclosure.
Figure 31B:
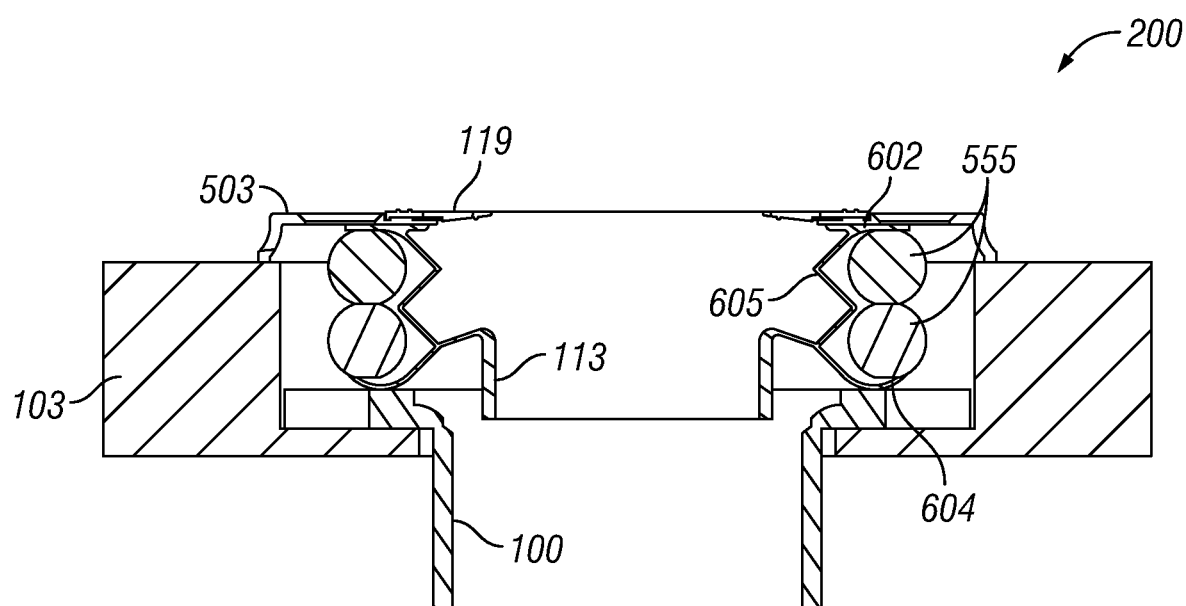

Referring to FIGS. 31A-31B, shown is an alternative embodiment of the closet collar adaptation assembly 200 according to various embodiments. In the embodiment shown, the closet collar adaptation assembly 200 includes the sealing washer 119, the adapter plate 503, one or more flexible rings 555, and the closet collar adapter 113. The closet collar adapter 113 in the embodiment shown may perform a similar function as the bellow 550 (FIG. 30A) discussed above. In particular, the closet collar adapter 113 in the present embodiment may act as a seal and thereby prevent liquids and/or gases from escaping from the closet collar adaptation assembly 200. To this end, the closet collar adapter 113 may include a first lip 602, a second lip 604, and a collapsible portion 605. As best shown in FIG. 31B, the first lip 602 may abut the adapter plate 503 and one of the flexible rings 555. Similarly, the second lip 604 may abut the closet collar 100 and one of the flexible rings 555. Thus, the closet collar adapter 113 may provide a seal and thereby prevent liquids and/or gases from escaping from the closet collar adaptation assembly 200.

In some embodiments, the first lip 602 may be positioned between the adapter plate 503 and the sealing washer 119. Also, some or all of the flexible components may be molded as a single component. For instance, all of the flexible components may be overmolded onto the adapter plate 503.

Figure 32A:
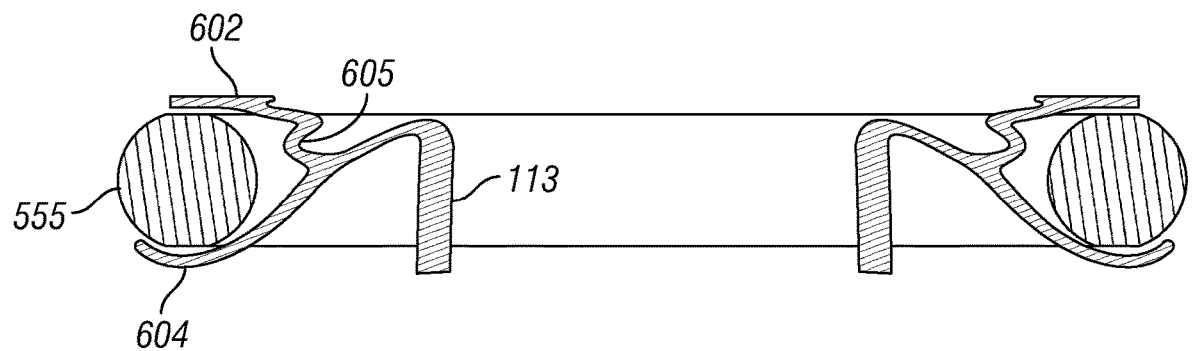

Referring to FIG. 32A, shown is an example of a portion of the closet collar adaptation assembly 200 of FIGS. 31A-31B for which a single flexible ring 555 is being used. As shown, the first lip 602 and the second lip 604 of the closet collar adapter 113 are in contact with the flexible ring 555, and the collapsible portion 605 of the closet collar adapter 113 is now at least partially collapsed.

Figure 32B:
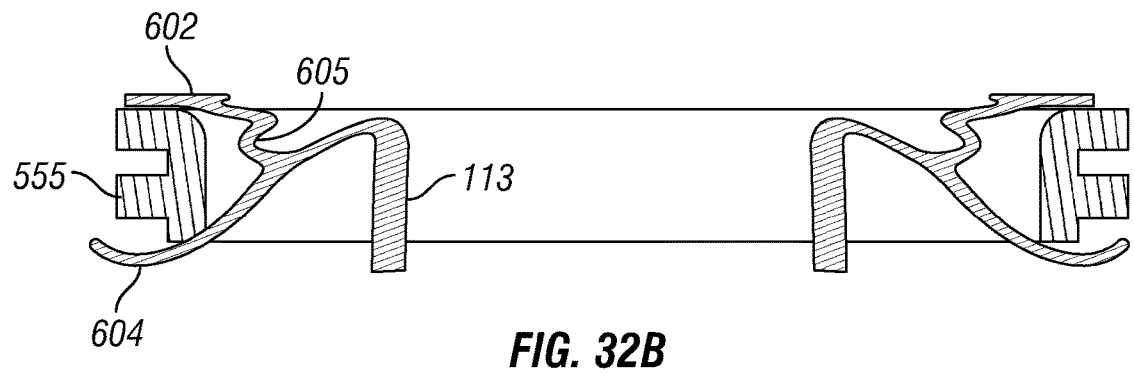

With reference to FIG. 32B, shown is an example of a portion of the closet collar adaptation assembly 200 of FIGS. 31A-31B according to various embodiments. In the present example, a portion of the flexible ring 555 of FIG. 28A is being used. As shown, the first lip 602 and the second lip 604 of the closet collar adapter 113 are in contact with the flexible ring 555, and the collapsible portion 605 of the closet collar adapter 113 is now at least partially collapsed.

Figure 32C:
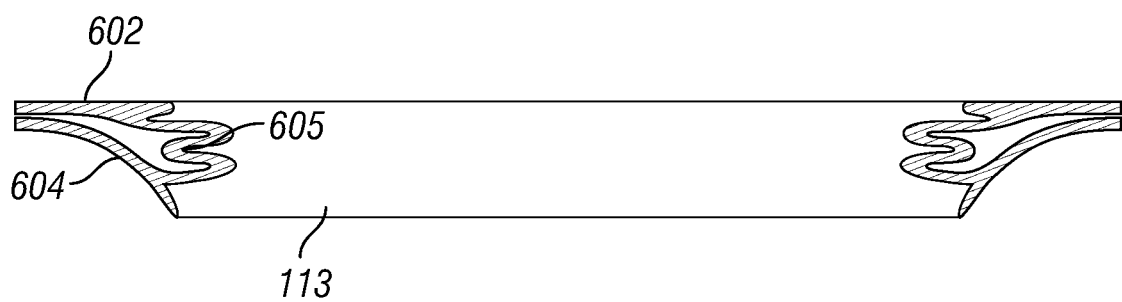

Referring to FIG. 32C, shown is an example of a portion of the closet collar adaptation assembly 200 of FIGS. 31A-31B for the case in which a flexible ring 555 (FIG. 32B) is not used. As shown, the collapsible portion 605 of the closet collar adapter 113 has partially collapsed to an extent that is even greater than as shown in FIGS. 32A-32B.

Figure 33A:
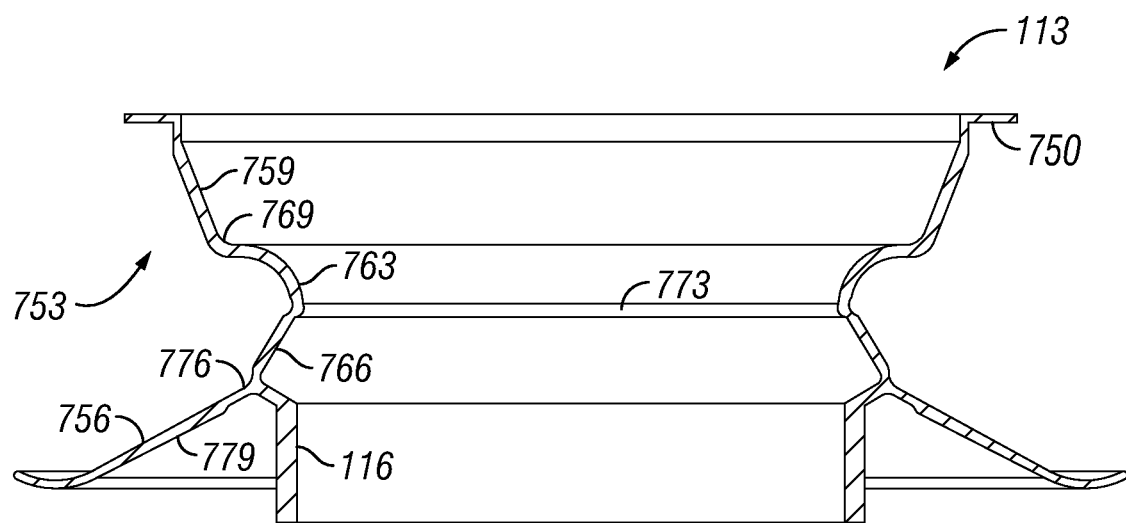
FIGS. 33A-33E are drawings showing another example of a closet collar adapter for a closet collar adaptation assembly according to various embodiments of the present disclosure.
Figure 33B:
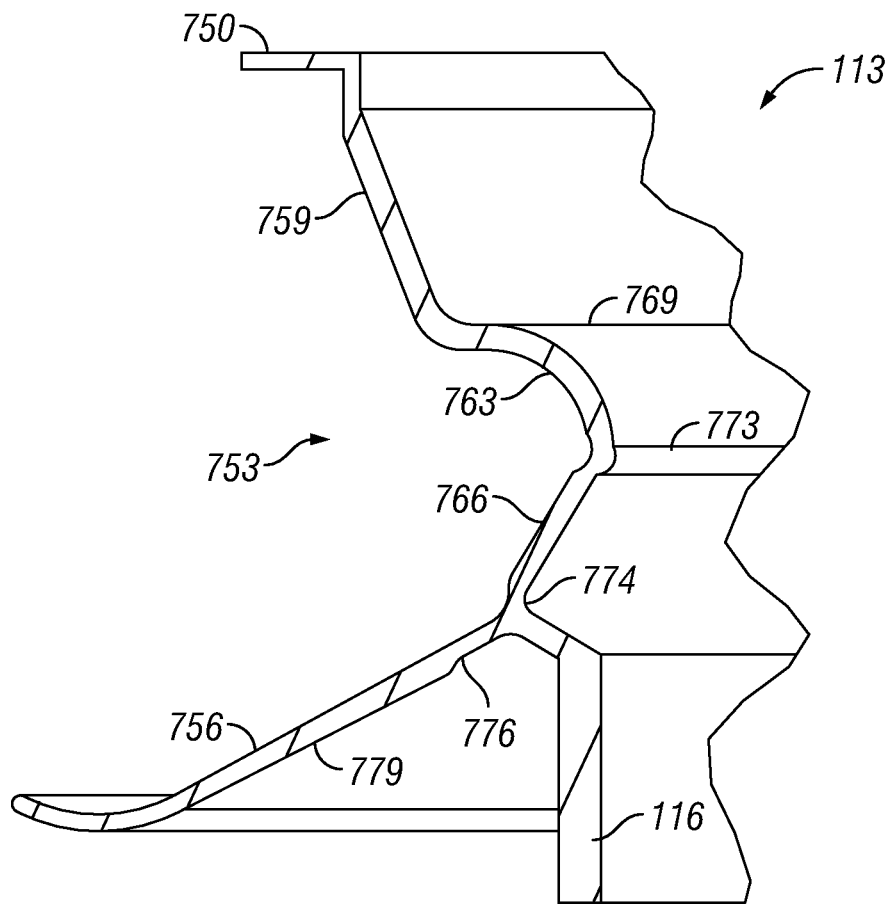

With reference now to FIGS. 33A-33B, shown is another example of a closet collar adapter 113 according to various embodiments. The closet collar adapter 113 shown may include a lip 750, a collapsible portion 753, a base 756, and the pipe extension 116. The collapsible portion 753 may further include a first portion 759, a second portion 763, and a third portion 766 of the closet collar adapter 113. A first edge 769 may connect the first portion 759 and the second portion 763 of the collapsible portion 753. Further, a second edge 773 may connect the second portion 763 and the third portion 766 of the collapsible portion 753 of the closet collar adapter 113. Additionally, a third edge 774 may connect the third portion 766 of the collapsible portion 753 to the base 756.

The first portion 759 of the collapsible portion 753 of the closet collar adapter 113 may have a wall thickness that is greater than the wall thickness of the second portion 763 and the third portion 766 of the collapsible portion 753. Additionally, the second edge 773 may be recessed inward with respect to the closet collar adapter 113. The base 756 may further include a first portion 776 and a second portion 779. The wall for the first portion 776 of the base 756 may be thinner than the wall for the second portion 779 of the base.

Figure 33C:
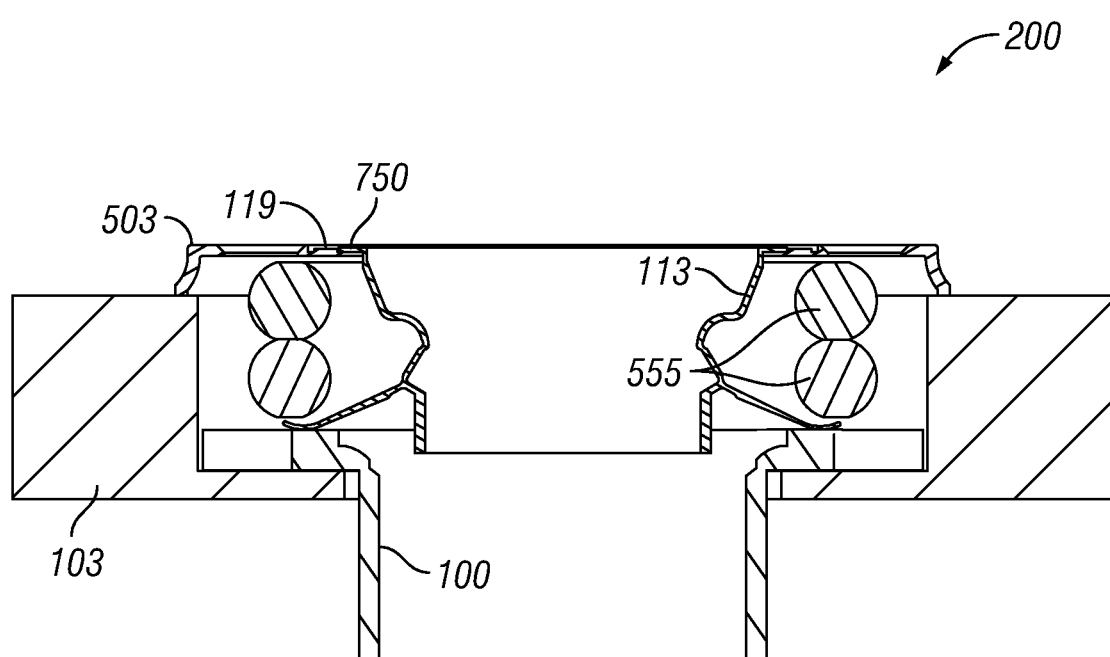

Turning to FIG. 33C, shown is another embodiment of the closet collar adaptation assembly 200 for which the closet collar adapter 113 of FIG. 33A is being used. As shown, the lip 750 of the closet collar adapter 113 may be disposed between the sealing washer 119 and the adapter plate 503. The base 756 of the closet collar adapter may be seated on the closet collar 100. One or more flexible rings 555 may be disposed between the closet collar adapter 113 and the flooring 103 as shown.

Figure 33D:
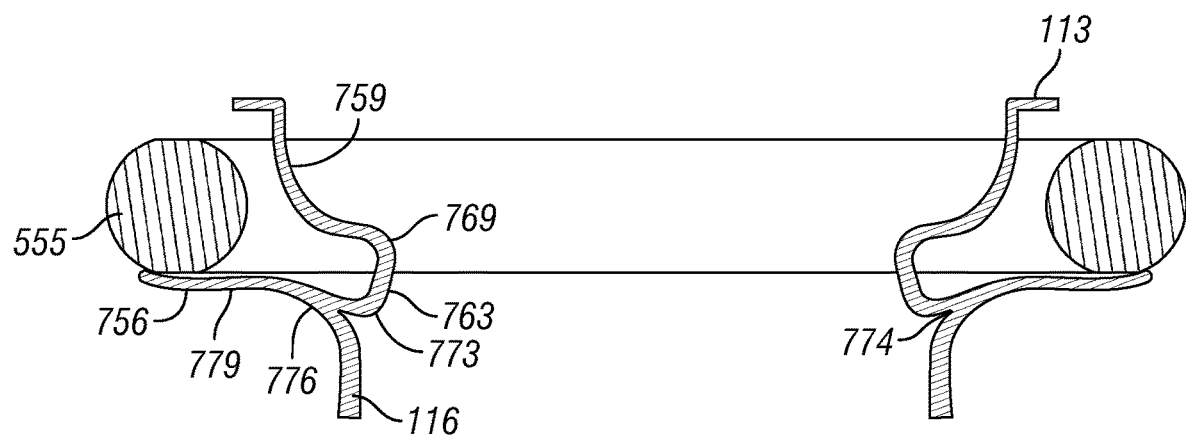

With reference to FIG. 33D, shown is a portion of the closet collar adaptation assembly 200 of FIG. 33B for the case in which a single flexible ring 555 is being used. As shown, the collapsible portion 753 of the closet collar adapter 113 has partially collapsed. In particular, the first portion 776 of the base 756 may flex and thereby facilitate the base 756 displacing downward. Additionally, the third edge 774 of the collapsible portion 753 may flex and facilitate the third portion 766 of the collapsible portion 753 displacing downward. Thus, a vertical distance between the third edge 774 and the second edge 773 may decrease.

The second portion 763 of the collapsible portion 753 may extend inward and downward by flexing about the second edge 773 and the first edge 769. As such, a vertical distance between the first edge 769 and the second edge 773 may decrease. Additionally, the first edge 769 may flex and facilitate the lip 750 and the first portion of the collapsible portion 753 displacing downward.

Figure 33E:
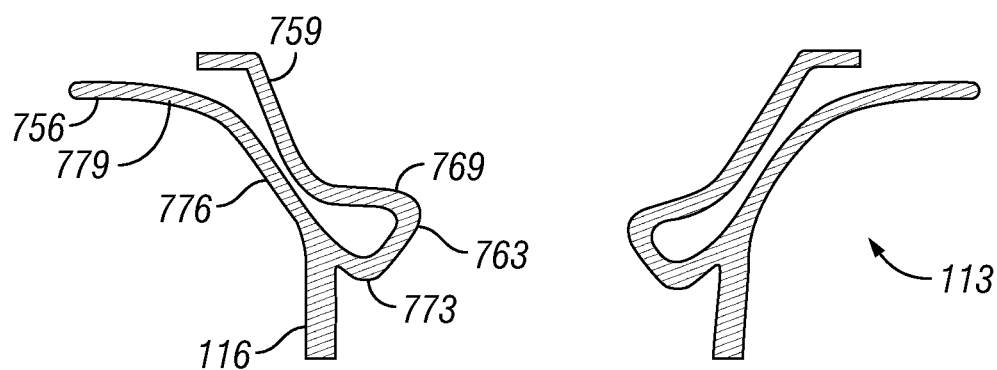

Turning now to FIG. 33E, shown is a portion of the closet collar adapter 113 collapsed, for example, in the event that a flexible ring 555 (33D) is not being used in conjunction with the closet collar adaptation assembly 200 (FIG. 33D).

It is emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure.

Therefore, the following is claimed:

1. An apparatus, comprising:
 a closet collar adapter configured to be positioned under a toilet, the closet collar adapter comprising:
  a pipe extension configured to be positioned within a closet collar for a drain pipe for the toilet;
  a receptacle for a sealing component on an underside of the closet collar adapter, the receptacle formed by at least an upper wall and a side wall of the closet collar adapter, where the side wall has an inner diameter that is greater than an outer diameter of a flange of the closet collar; and
  a flexible sealing material extending inward from the upper wall to a center opening aligned with the pipe extension, the flexible sealing material comprising a protrusion extending upward from an upper surface of the flexible sealing material and encircling the center opening, where at least a portion of the flexible sealing material is configured to contact with a horn of the toilet and flex below an entirety of the upper wall to form a seal between the toilet and the closet collar adapter.

2. The apparatus of claim 1, wherein the protrusion is one of a plurality of protrusions extending upward from the upper surface of the flexible sealing material and encircling the center opening.

3. The apparatus of claim 1, wherein the protrusion has a semi-circular cross-section.

4. The apparatus of claim 1, wherein the flexible sealing material is positioned on an upper surface of the closet collar adapter.

5. The apparatus of claim 1, comprising an adapter plate and a fastener that is configured to fasten the toilet to the adapter plate.

6. The apparatus of claim 1, wherein the sealing component comprises a wax ring that is configured to be positioned between the closet collar adapter and a flooring under the toilet.

7. The apparatus of claim 1, wherein the sealing component comprises at least one flexible seal ring that is configured to be positioned between the closet collar adapter and a flooring under the toilet.

8. The apparatus of claim 7, wherein the at least one flexible seal ring is configured to return at least partially to a previous shape when the at least one flexible seal ring is removed from the receptacle for the sealing component.

9. The apparatus of claim 7, wherein the at least one flexible seal ring comprises a foam rubber material.

10. The apparatus of claim 1, wherein the sealing component is formed separately from the receptacle and is configured to be fitted within the receptacle underneath the closet collar adapter.

11. A system, comprising:
 a toilet positioned over a closet collar for a drain pipe in a flooring; and
 a closet collar adapter positioned under the toilet, the closet collar adapter forming at least one seal between the toilet and the closet collar, wherein the closet collar adapter comprises:
  a pipe extension configured to be positioned within the closet collar;
  a receptacle for a sealing component on an underside of the closet collar adapter, the receptacle formed by an upper wall and a side wall of the closet collar adapter, where the side wall has an inner diameter that is greater than an outer diameter of a flange of the closet collar; and
  a flexible sealing material extending inward from the upper wall to a center opening aligned with the pipe extension, the flexible sealing material comprising a protrusion extending upward from an upper surface of the flexible sealing material and encircling the center opening, where at least a portion of the flexible sealing material is configured to contact with a horn of the toilet and flex below an entirety of the upper wall to form at least a portion of the at least one seal.

12. The system of claim 11, wherein the protrusion is one of a plurality of protrusions extending upward from the upper surface of the flexible sealing material and encircling the center opening.

13. The system of claim 11, wherein the protrusion has a semi-circular cross-section.

14. The system of claim 11, comprising an adapter plate fastened to the flooring using a plurality of first fasteners, the adapter plate being fastened to the toilet using a plurality of second fasteners.

15. The system of claim 11, wherein the closet collar adapter forms at least a portion of a closet collar adaptation assembly.

16. The system of claim 11, comprising a flexible seal ring in the receptacle for the sealing component, the flexible seal ring forming at least a portion of the at least one seal.

17. The system of claim 16, wherein the flexible seal ring comprises a foam rubber material.

18. The system of claim 17, wherein the foam rubber material is composed of neoprene, polyvinylchloride (PVC) rubber, thermoplastic elastomer (TPE), thermoplastic rubber (TPR), styrene-butadiene rubber (SBR), or ethylene propylene diene monomer (EPDM) rubber.

* * * * *